(12) United States Patent
Yamazaki

(10) Patent No.: US 7,271,861 B2
(45) Date of Patent: Sep. 18, 2007

(54) LIQUID CRYSTAL DISPLAY DEVICE PROTECTION STRUCTURE FOR ELECTRONIC EQUIPMENT

(75) Inventor: Nobuyuki Yamazaki, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 126 days.

(21) Appl. No.: 10/933,331

(22) Filed: Sep. 3, 2004

(65) Prior Publication Data

US 2005/0285991 A1 Dec. 29, 2005

(30) Foreign Application Priority Data

Jun. 28, 2004 (JP) .............................. 2004-190025

(51) Int. Cl.
*G02F 1/1333* (2006.01)
*G06K 1/16* (2006.01)
(52) U.S. Cl. ........................................ 349/58; 361/681
(58) Field of Classification Search ................. 349/58; 361/681
See application file for complete search history.

(56) References Cited

U.S. PATENT DOCUMENTS 5,986,726 A * 11/1999 Murai .......................... 349/59
6,477,039 B2 * 11/2002 Tajima ....................... 361/681
6,747,713 B1 * 6/2004 Sato ............................ 349/58
2006/0055839 A1 * 3/2006 Hirao et al. .................. 349/58

FOREIGN PATENT DOCUMENTS

| JP | 60-152977 | 8/1985 |
| JP | 2001-69213 | 3/2001 |
| JP | 2002-149272 | 5/2002 |

OTHER PUBLICATIONS

Japanese Patent Office "Notification of Reasons for Rejection" mailed May 30, 2006, issued in counterpart Japanese Patent Application No. 2004-190025.

* cited by examiner

*Primary Examiner*—Mike Qi
(74) *Attorney, Agent, or Firm*—Finnegan, Henderson, Farabow, Garrett & Dunner, L.L.P.

(57) ABSTRACT

A liquid crystal display device protection structure for electronic equipment having an equipment cabinet made of a plastic material in which a liquid crystal display device is accommodated, the equipment cabinet formed with a viewing window so as to be faced with a display screen of the liquid crystal display device, comprises a reinforcing frame made of a material having a mechanical strength higher than that of the plastic material used for the equipment cabinet, and having a frame shape matched to a periphery of the viewing window, the reinforcing frame being integrally fixed to the equipment cabinet so as to be matched to the periphery of the viewing window, and a display screen protection cover which covers the viewing window and is mounted to the reinforcing frame.

2 Claims, 20 Drawing Sheets

LIQUID CRYSTAL DISPLAY DEVICE PROTECTION STRUCTURE FOR ELECTRONIC EQUIPMENT

CROSS-REFERENCE TO RELATED APPLICATIONS

This application is based upon and claims the benefit of priority from the prior Japanese Patent Application No. 2004-190025 filed on Jun. 28, 2004; the entire contents of which are incorporated herein by reference.

FIELD OF THE INVENTION

The present invention relates to a liquid crystal display device protection structure for electronic equipment, and specifically, to a protection structure for preventing the damage to the liquid crystal display device, which can be applied to electronic equipment including a liquid crystal display device accommodated in the inside of an equipment cabinet made of a plastic material, a viewing window which is faced with the display screen of the liquid crystal display device and is formed in the equipment cabinet, and a display screen protection cover which covers the viewing window.

BACKGROUND OF THE INVENTION

In a mobile phone, which is a type of electronic equipment, a liquid crystal display device for informing a variety of information to the user by means of characters and images is mounted. In a foldable mobile phone A as shown in FIG. 19 and FIG. 20, a liquid crystal display device E is accommodated in the inside of an upper cabinet D which is connected to a lower cabinet B having a variety of controllers by means of a hinge C.

The liquid crystal display device E together with a backlight device G is mounted, through a holder H, on a circuit board F disposed in the upper cabinet D that comprises an upper inner casing Da and an upper outer casing Db. In the upper inner casing Da, a viewing window Do which is faced with the display screen Ef of the liquid crystal display device E is formed. In the viewing window Do, a display screen protection cover I made of a light transmitting material is mounted.

In general electronic equipment, the equipment cabinet is made of a plastic material for the purposes of reduction in weight, etc. With the mobile phone A described above in which a large viewing window Do is formed in the upper inner casing Da, the upper inner casing Da is likely to be deflected or deformed relatively easily when the display screen protection cover I is heavily depressed from the outside, which may cause the display screen protection cover I to be brought into contact with the liquid crystal display device E, resulting in that damages such as cracks are created in the display device E.

Possible solutions to such a problem are to increase the wall thickness of the upper cabinet D including that of the upper inner casing Da thereby enhancing the strength, or to increase the clearance between the display screen Ef of the liquid crystal display device E and the display screen protection cover I. However, these solutions inevitably cause another problem of an undesired increase in the size of the mobile phone A.

On the other hand, a solution which increases the mechanical strength of the equipment cabinet has been proposed in which the equipment cabinet made of a plastic material is integrally molded with the reinforcing member made of a metallic material.

Specifically, as shown in FIG. 21, an upper inner casing Da' accommodates, together with an upper outer casing Db', a liquid crystal display device E' which is loaded on a circuit board F' through a holder H'. A display screen protection cover I' is mounted in a viewing window Do' of the upper inner casing Da' and a pair of hinges C' are provided at the base side end of the upper inner casing Da'. Further, the upper inner casing Da' is integrally molded with a reinforcing member J as shown in FIG. 22 in the injection molding.

The reinforcing member J has a top plate Ja in which an opening Jo is formed corresponding to the viewing window Do' in the upper inner casing Da'. A pair of side plates Jb are erected from the right and left edges of the top plate Ja, and a pair of bearing members Jc which have a cylindrical shape are formed at the base side end of the top plate Ja.

According to this configuration, the mechanical strength of the upper inner casing Da' is greatly improved because it is integrally formed with the reinforcing member J. With this configuration, even if the display screen protection cover I' is heavily pressed from the outside, the upper inner casing Da' will not be easily deflected or deformed. Thus, damage to the liquid crystal display device E' due to the contact with the display screen protection cover I' can be prevented.

However, with the configuration as described above, although the mechanical strength of the upper inner casing Da' is improved, the reinforcing member J occupies a significantly large portion of the inside of the upper inner casing Da' as shown in FIG. 23. Therefore, the size of the outline shape is inevitably increased.

Further, with the configuration as described above, the top plate Ja, the right and left side plates Jb, and the pair of bearing members Jc are provided, thus the reinforcing member J is integrally insert molded with the upper inner casing Da' over the entire area of the upper inner casing Da', which results in an increase in the rigidity of the upper inner casing Da' as a whole, which leads to an increase in the rigidity of the upper cabinet including the upper inner casing Da'.

Therefore, even if the display screen protection cover I' is heavily pressed from the outside, damage to the liquid crystal display device E' can be prevented. However, because the upper cabinet has a high rigidity and lacks the flexibility as stated above, when the upper cabinet is subjected to a great impact force due to such a cause as dropping, the impact force is neither absorbed nor attenuated by the upper cabinet, but directly acts on the liquid crystal display device E'. As a result, the liquid crystal display device E', which comprises a glass substrate, and the plastic material portion itself of the equipment cabinet may be cracked or otherwise damaged.

SUMMARY OF THE INVENTION

The present invention has been made in view of the above-mentioned problems, and may provide a liquid crystal display device protection structure for electronic equipment that allows the outline size to be minimized while preventing damage to the liquid crystal display device.

According to a first aspect of the invention, a liquid crystal display device protection structure for electronic equipment having an equipment cabinet made of a plastic material in which a liquid crystal display device is accommodated, the equipment cabinet formed with a viewing window so as to be faced with a display screen of the liquid crystal display device, comprises a display screen protection cover which covers the viewing window; and a reinforcing frame made of a material having a mechanical strength higher than that of the plastic material used for the equipment cabinet, and having a frame shape matched to a periphery of the viewing window, the reinforcing frame being integrally fixed to the equipment cabinet so as to be matched to the periphery of the viewing window, wherein the display screen protection cover is mounted to the reinforcing frame.

With this configuration of the liquid crystal display device protection structure for electronic equipment according to the first aspect of the invention, the rigidity at the periphery of the viewing window is greatly improved by integrally fixing the reinforcing frame having a frame shape to the equipment cabinet, and thus, even when the display screen protection cover is pressed from the outside, the equipment will not be easily deflected or deformed at the periphery of the viewing window of the equipment cabinet, which allows damage to the liquid crystal display device to be prevented without increasing the outline size by increasing the wall thickness of the equipment cabinet or otherwise changing the configuration.

In addition, the liquid crystal display device protection structure for electronic equipment according to the first aspect of the invention, the flexibility of the plastic material used for the equipment cabinet is retained in the areas other than the periphery of the viewing window in the equipment cabinet, where the rigidity is greatly improved by fixing the reinforcing frame having a frame shape. Therefore, even when the equipment cabinet is dropped, for example, and subjected to a great impact force, the impact force will be attenuated by the flexibility of the equipment cabinet made of a plastic material, and thus will not directly act on the liquid crystal display device, which allows preventing of damage to the liquid crystal display device.

Thus, with the liquid crystal display device protection structure for electronic equipment according to the first aspect of the present invention, the outline size can be minimized while damage to the liquid crystal display device can be prevented, even when the display screen protection cover is pressed from the outside, or when the equipment cabinet is dropped, for example, and subjected to an impact force.

A liquid crystal display device protection structure for electronic equipment according to a second aspect of the present invention provides a liquid crystal display device protection structure for electronic equipment according to the first aspect of the present invention, wherein the reinforcing frame has a box-like shape, and comprises a front plate that is developed so as to be matched to the display screen of the liquid crystal display device, and has an opening for exposing the display screen; and side plates that are developed from an outer edge of the front plate to a direction along thickness of the front plate so as to surround an entire periphery of the liquid crystal display device.

With this configuration of the liquid crystal display device protection structure for electronic equipment according to the second aspect of the present invention, the outline size can be minimized while damage to the liquid crystal display device can be prevented, as with the liquid crystal display device protection structure for electronic equipment relating to the invention as set forth in claim 1, and because the reinforcing frame is adapted to provide a box-like shape with the front plate and the side plates, the rigidity of the reinforcing frame itself is improved, with the rigidity at the periphery of the viewing window in the equipment cabinet where the reinforcing frame is integrally fixed being greatly improved; therefore the effect of prevention of the liquid crystal display device from being damaged when the display screen protection cover is pressed from the outside is substantially enhanced.

A liquid crystal display device protection structure for electronic equipment according to a third aspect of the present invention provides a liquid crystal display device protection structure for electronic equipment according to the second aspect of the present invention, wherein the reinforcing frame has four corners each of which is formed by the front plate and the side plates which are adjacent to each other, and the front plate and the side plates which are adjacent to each other are connected to one another.

With this configuration of the liquid crystal display device protection structure for electronic equipment according to the third aspect of the present invention, the front plate and the side plates adjacent to each other which form each of the four corners are connected to one another, which results in the rigidity of the reinforcing frame itself being substantially improved, with the rigidity at the periphery of the viewing window in the equipment cabinet where the reinforcing frame is integrally fixed being greatly improved; therefore the effect of prevention of the liquid crystal display device from being damaged when the display screen protection cover is pressed from the outside is substantially enhanced.

A liquid crystal display device protection structure for electronic equipment according to a fourth aspect of the present invention, a liquid crystal display device protection structure for electronic equipment according to the first aspect of the present invention, wherein the reinforcing frame is integrally fixed to the equipment cabinet by insert molding of the reinforcing frame to the equipment cabinet.

With this configuration of the liquid crystal display device protection structure for electronic equipment according to the fourth aspect of the present invention, the reinforcing frame is integrally fixed to the equipment cabinet by insert molding; therefore, the reinforcing frame can be extremely easily fixed to the equipment cabinet.

A liquid crystal display device protection structure for electronic equipment according to a fifth aspect of the present invention provides a liquid crystal display device protection structure for electronic equipment according to the first aspect of the present invention, wherein, by hooking the reinforcing frame to claws provided for the equipment cabinet, the reinforcing frame is integrally fixed to the equipment cabinet.

With the liquid crystal display device protection structure for electronic equipment according to the fifth aspect of the present invention, the reinforcing frame is integrally fixed to the equipment cabinet by hooking the reinforcing frame to claws provided for the equipment cabinet; therefore, the reinforcing frame can be extremely easily fixed to the equipment cabinet.

A liquid crystal display device protection structure for electronic equipment according to a sixth aspect of the present invention provides a liquid crystal display device protection structure for electronic equipment according to the first aspect of the present invention, wherein, by welding the reinforcing frame to the equipment cabinet, the reinforcing frame is integrally fixed to the equipment cabinet.

With this configuration of the liquid crystal display device protection structure for electronic equipment according to the sixth aspect of the present invention, the reinforcing frame is integrally fixed to the equipment cabinet by welding; therefore, the reinforcing frame can be extremely easily fixed to the equipment cabinet.

A liquid crystal display device protection structure for electronic equipment according to a seventh aspect of the present invention provides a liquid crystal display device protection structure for electronic equipment according to the first aspect of the present invention, wherein, by using screws for fixing the reinforcing frame to the equipment cabinet, the reinforcing frame is integrally fixed to the equipment cabinet.

With this configuration of the liquid crystal display device protection structure for electronic equipment according to the seventh aspect of the present invention, the reinforcing frame is integrally fixed to the equipment cabinet by using screws; therefore, the reinforcing frame can be extremely easily fixed to the equipment cabinet.

A liquid crystal display device protection structure for electronic equipment according to an eighth aspect of the present invention provides a liquid crystal display device protection structure for electronic equipment according to the first aspect of the present invention, wherein, by hooking hooks provided for the reinforcing frame to the equipment cabinet, the reinforcing frame is integrally fixed to the equipment cabinet.

With this configuration of the liquid crystal display device protection structure for electronic equipment according to the eighth aspect of the present invention, the reinforcing frame is integrally fixed to the equipment cabinet by hooking hooks provided for the reinforcing frame to the equipment cabinet; therefore, the reinforcing frame can be extremely easily fixed to the equipment cabinet.

BRIEF DESCRIPTION OF THE DRAWINGS

Embodiments of the present invention will be described in detail based on the following figures, wherein.

DESCRIPTION OF THE EMBODIMENTS

Figure 1:
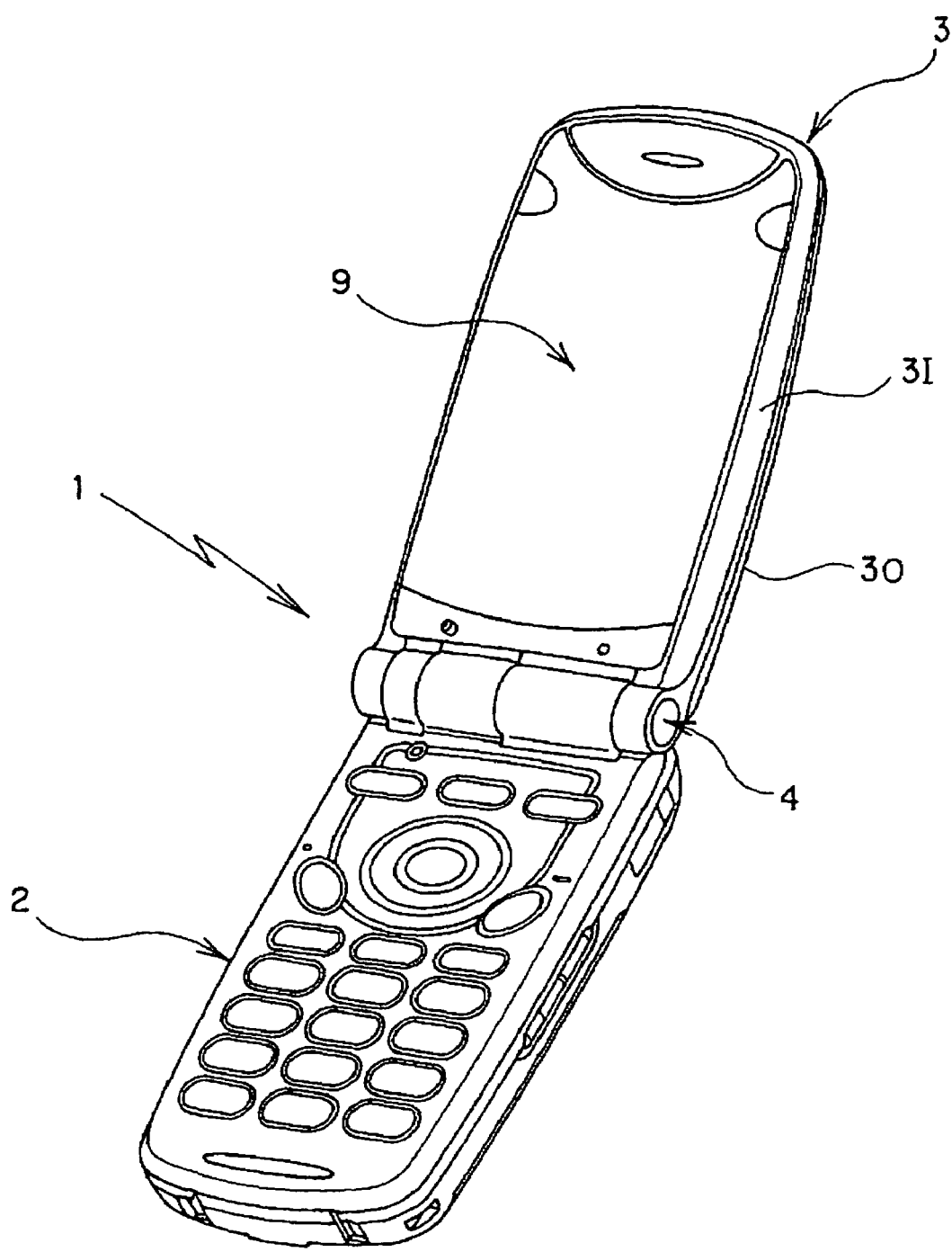
FIG. 1 is an appearance perspective view showing a first embodiment of electronic equipment which adopts a liquid crystal display device protection structure relating to the present invention.

Embodiments of the present invention will be described with reference to the accompanying drawings.

FIG. 1 through FIG. 6 show a first embodiment where a liquid crystal display device protection structure relating to the present invention is applied to a foldable mobile phone, which is a type of electronic equipment. This mobile phone 1 comprises a lower cabinet 2 provided with a variety of controllers, and an upper cabinet 3 accommodating a liquid crystal display device 7 later described. The lower cabinet 2 and the upper cabinet 3 are connected to each other through a hinge 4 such that the foldable mobile phone can be freely opened and closed.

The upper cabinet 3, which constitutes the equipment cabinet together with the lower cabinet 2, comprises an upper inner casing 3I and an upper outer casing 3O which are assembled to each other, and the upper inner casing 3I and the upper outer casing 3O are both manufactured in a desired shape by injection molding of plastic material.

Figure 2:
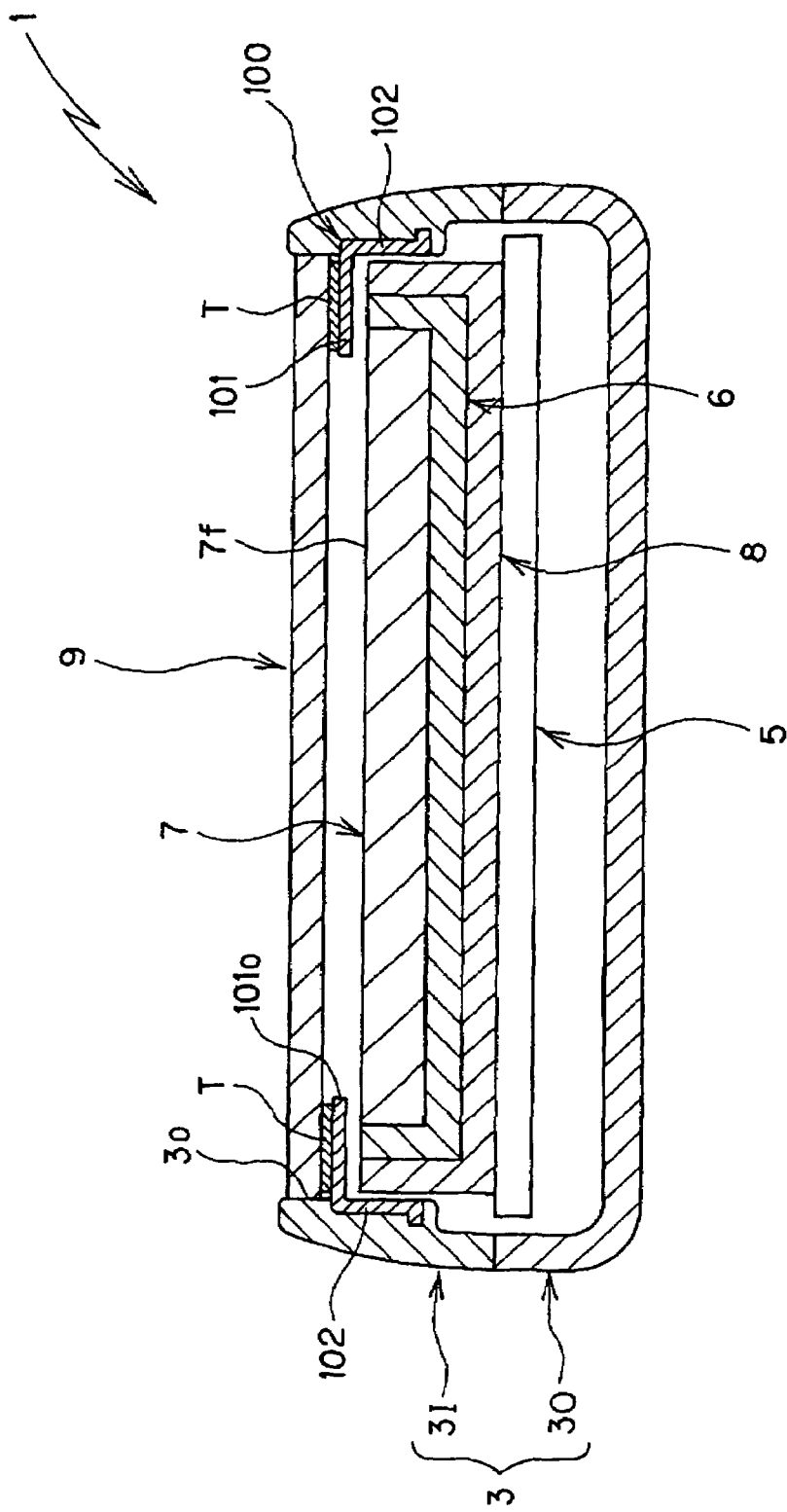
FIG. 2 is a transverse cross section showing the electronic equipment of the first embodiment.
Figure 3:
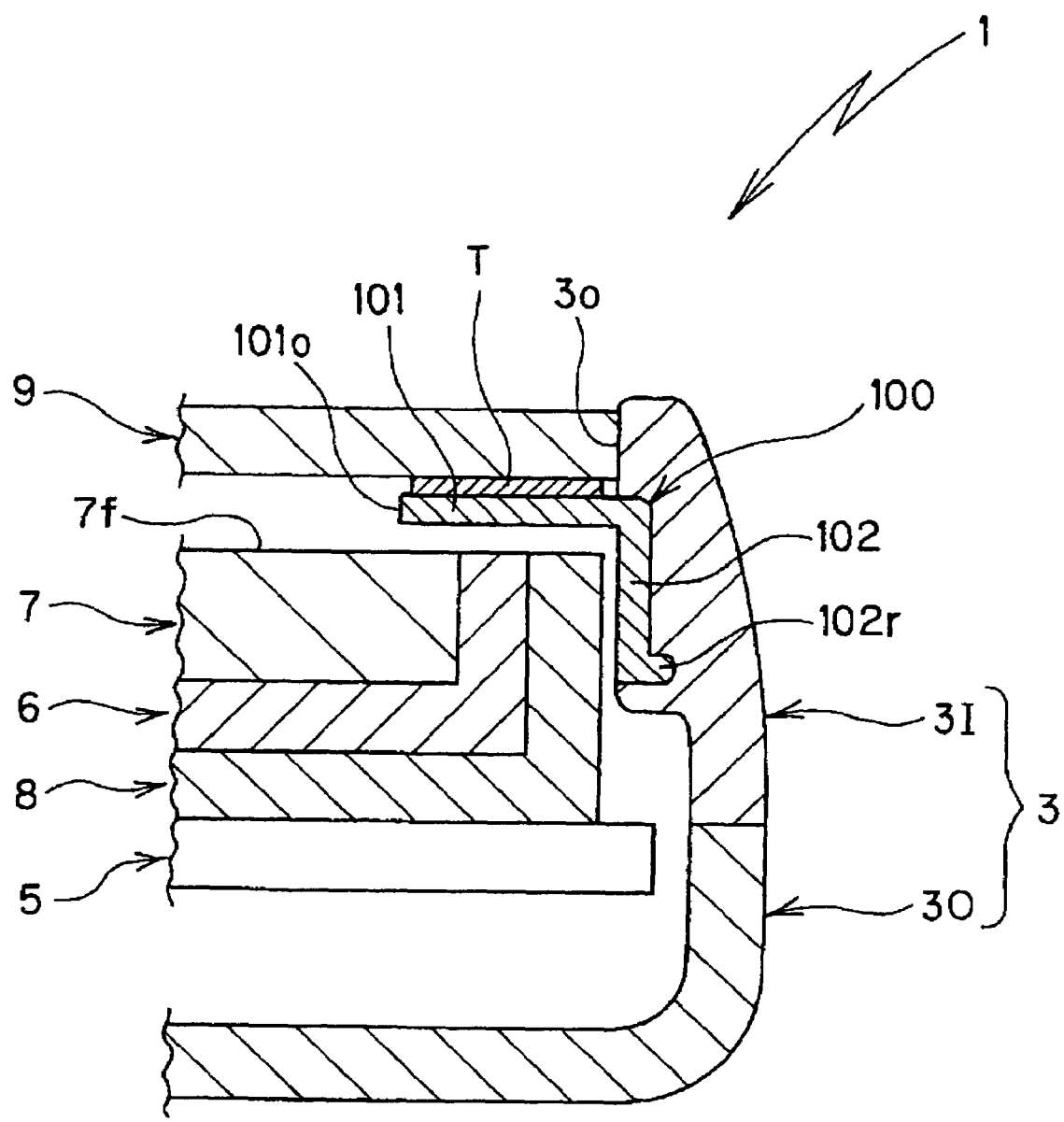
FIG. 3 is a main portion enlarged sectional view showing the electronic equipment of the first embodiment.

As shown in FIG. 2 and FIG. 3, a circuit board 5 is accommodated in the inside of the upper cabinet 3, and on the component mounting surface of the circuit board 5, a backlight device 6 and a liquid crystal display device 7 constituting a liquid crystal display unit are mounted in a prescribed location through a holder 8.

In the upper inner casing 3I in the upper cabinet 3 is formed a viewing window 3o which is faced with the display screen 7f of the liquid crystal display device 7. To the front of the inner casing 3I is mounted a display screen protection cover 9 made of a light transmitting material, such as a clear acrylic plastic material, with the use of a double-sided adhesive tape (not shown), the viewing window 3o in the upper inner casing 3I being covered with the display screen protection cover 9.

Further, in the upper inner casing 3I of the upper cabinet 3, a reinforcing frame 100 having a frame shape which is matched to the periphery of the viewing window 3o is integrally fixed to the upper inner casing 3I. The reinforcing frame 100 is formed by press working (drawing operation) of a material with a mechanical strength higher than that of the plastic material used for the upper inner casing 3I and the like. Specifically, the reinforcing frame 100 may be formed of a stainless steel sheet.

Figure 4:
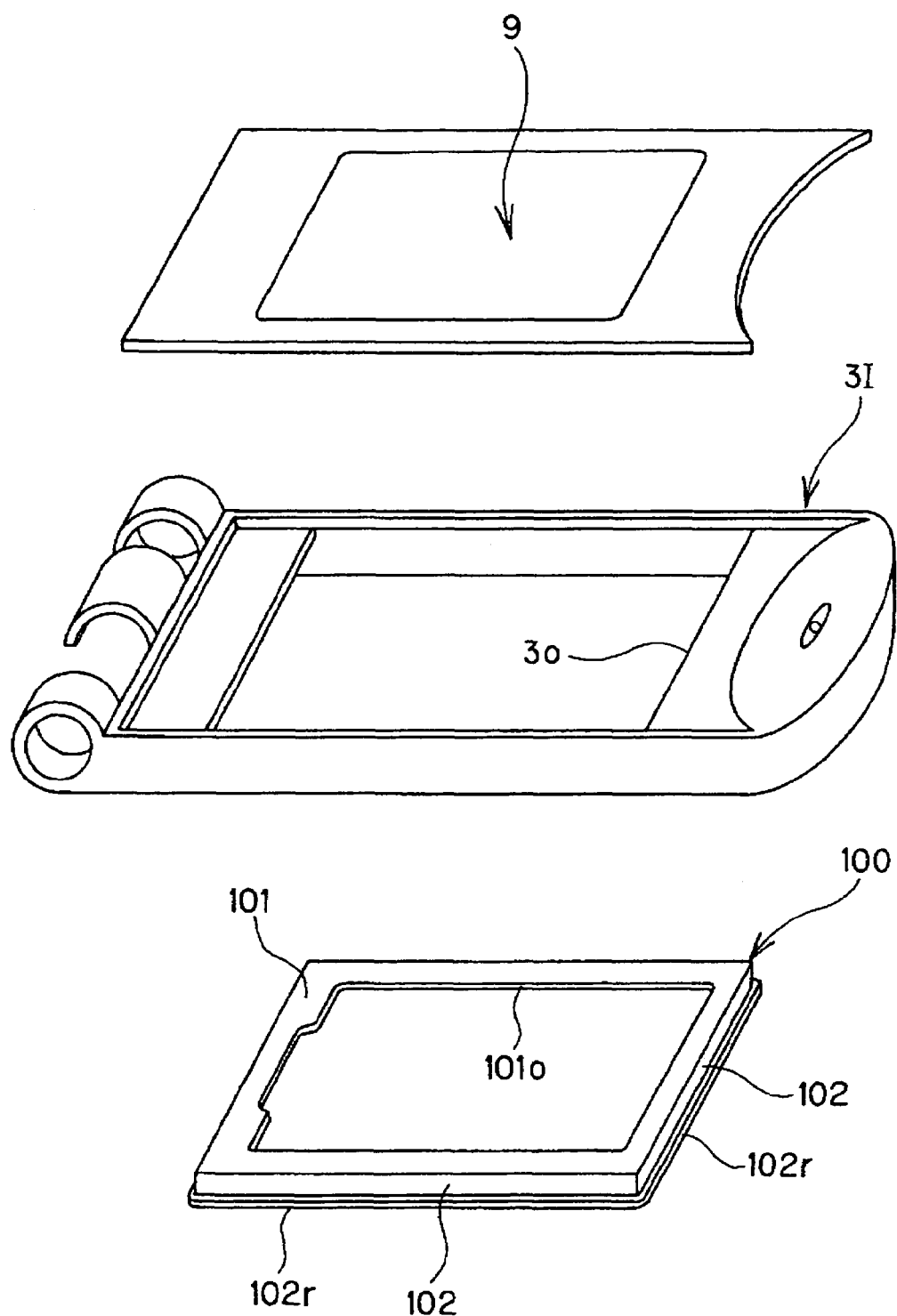
FIG. 4 is an exploded perspective view showing an upper inner casing assembly in the electronic equipment of the first embodiment.
Figure 5:
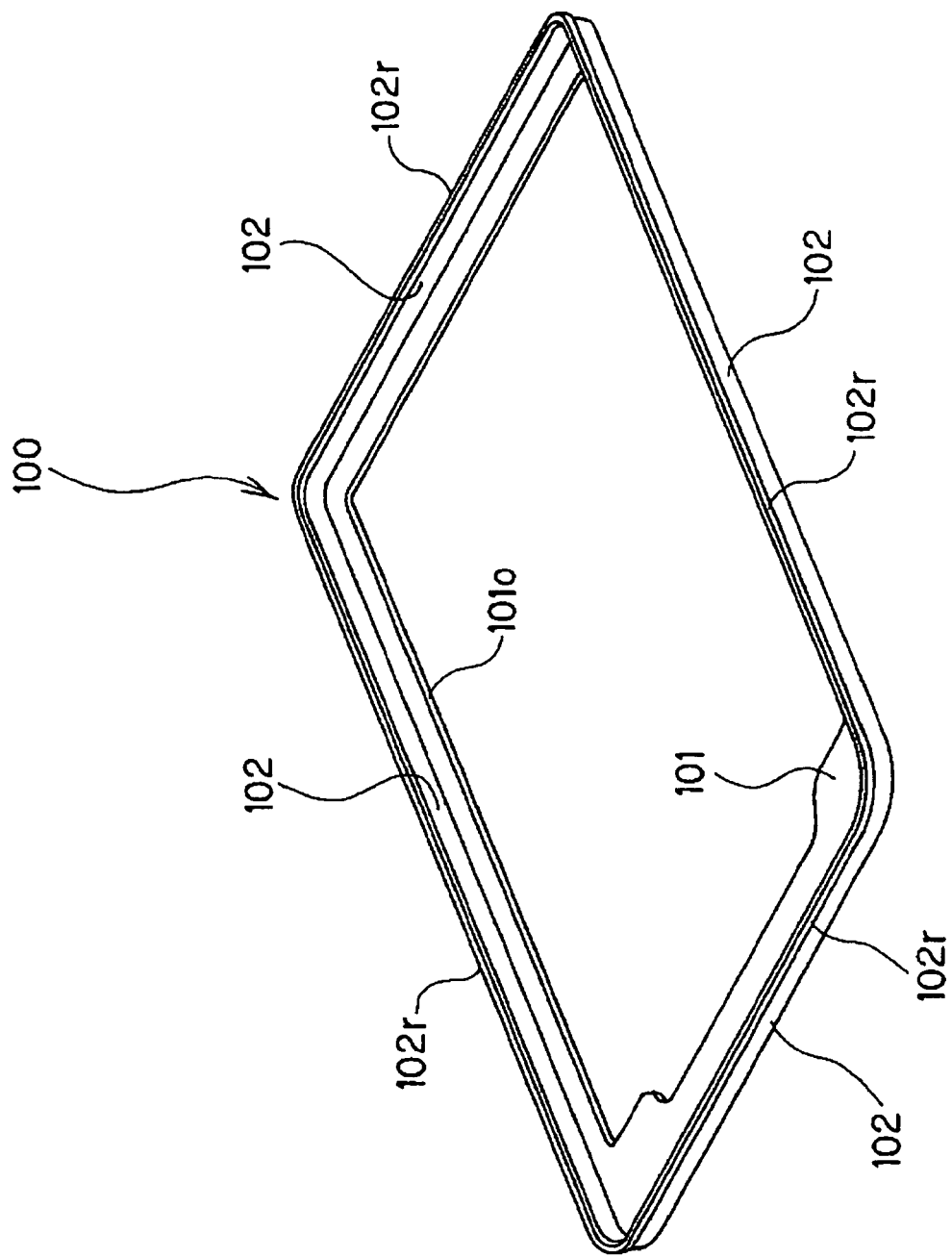
FIG. 5 is an appearance perspective view showing a reinforcing frame in the electronic equipment of the first embodiment.

As shown in FIG. 4 and FIG. 5, the reinforcing frame 100 has a front plate 101 which is developed so as to be matched to the display screen 7f of the liquid crystal display device 7. The reinforcing frame 100 further has side plates 102 on all the sides that surround the liquid crystal display device 7. The side plates 102 are developed from the outer edge of the front plate 101 in the direction along the plate thickness, specifically, towards the inside of the upper inner casing 3I, and are formed over the entire periphery of the front plate 101.

In the front plate 101 of the reinforcing frame 100, an opening 101o for exposing the display screen 7f of the liquid crystal display device 7 is formed. At the edges of the side plates 102 on all the sides, a rib 102r is formed over the entire periphery.

As stated above, the reinforcing frame 100 comprising the front plate 101 having the opening 101o and the side plates 102 on all the sides thereof has a frame shape which is matched to the periphery of the viewing window 3o, and also has a box-like shape having four corners each of which is formed by the front plate 101 and the adjacent side plates 102.

Further, the reinforcing frame 100 is integrally fixed to the upper inner casing 3I by insert molding when the upper inner casing 3I is injection molded.

Figure 6:
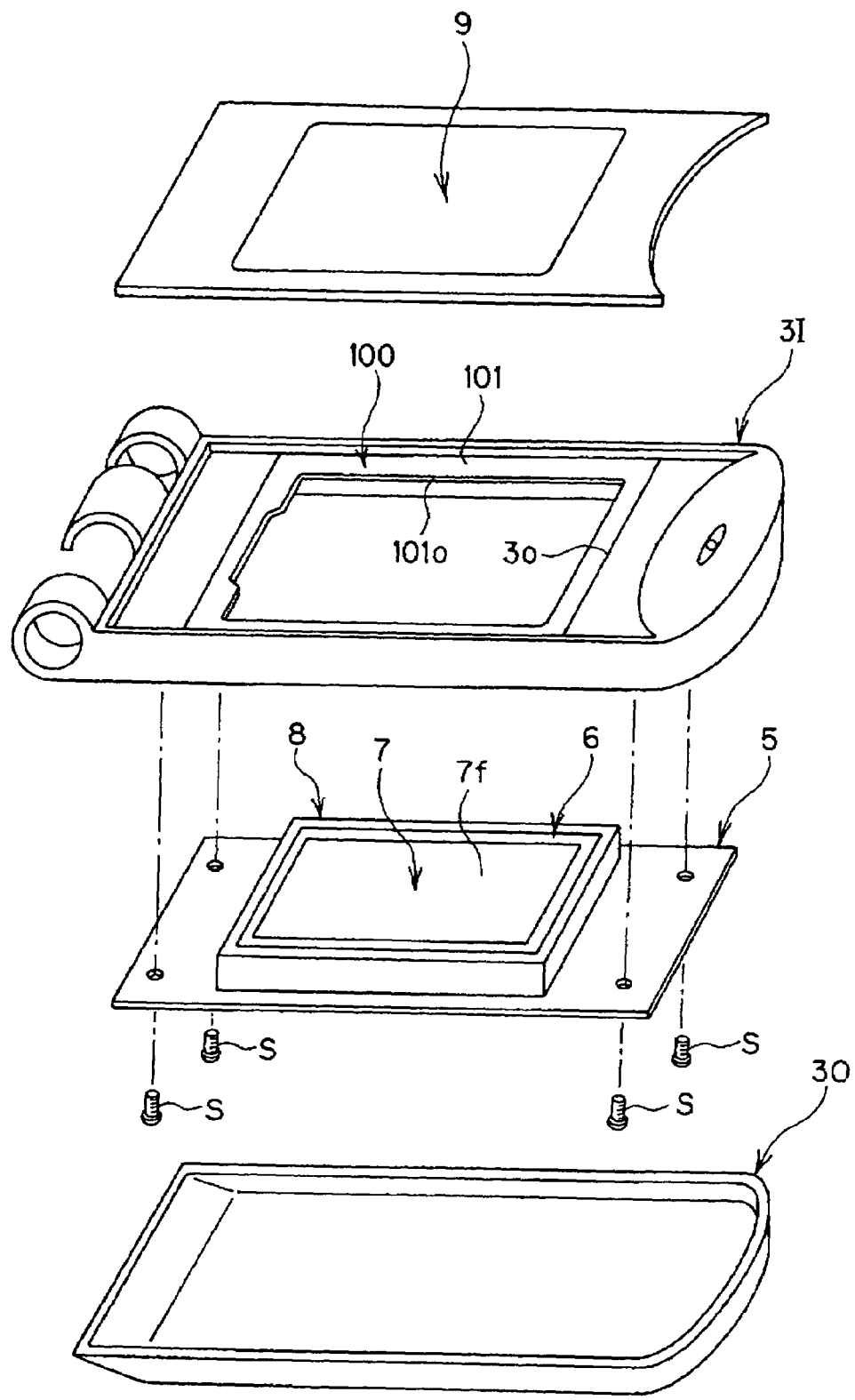
FIG. 6 is an exploded perspective view showing the electronic equipment of the first embodiment.

As shown in FIG. 2 and FIG. 6, the front plate 101 of the reinforcing frame 100 which is fixed to the upper inner casing 3I is exposed in the viewing window 3o in the upper inner casing 3I. To the front plate 101 (the reinforcing frame 100), the display screen protection cover 9 is mounted by using the double-sided adhesive tape T as shown in FIG. 2 and FIG. 3.

With the mobile phone 1 which adopts the liquid crystal display device protection structure as stated above, the rigidity at the periphery of the viewing window 3o is greatly improved by integrally fixing the reinforcing frame 100 having a frame shape to the upper inner casing 3I, and thus, even when the display screen protection cover 9 is pressed from the outside, the mobile phone 1 will not be easily deflected or deformed at the periphery of the viewing window 3o of the upper inner casing 3I.

In addition, the display screen protection cover 9 is mounted to the front plate 101 of the reinforcing frame 100. Thus, even when the display screen protection cover 9 is pressed from the outside, the reinforcing frame 100, which has a great mechanical strength, positively supports the external force, which results in no undesired deformation being produced in the upper inner casing 3I.

Therefore, without the need for increasing the wall thickness of the upper cabinet 3 including the upper inner casing 3I to enhance the strength, or for widening the clearance between the display screen 7f of the liquid crystal display device 7 and the display screen protection cover 9, in other words, without any undesired increase in the size of the mobile phone 1 being caused, damage to the liquid crystal display device 7 can be prevented.

In addition, with the mobile phone 1 which adopts the liquid crystal display device protection structure as stated above, the flexibility of the plastic material used for the upper cabinet 3 is retained in the areas other than the periphery of the viewing window 3o in the upper inner casing 3I, where the rigidity is greatly improved by fixing the reinforcing frame 100 having a frame shape. Therefore, even when the upper cabinet 3 is dropped, for example, and subjected to a great impact force, the impact force will be attenuated by the flexibility of the upper cabinet 3 made of a plastic material, and thus will not directly act on the liquid crystal display device 7. As a result, damage to the liquid crystal display device 7 and the plastic material portion itself of the equipment cabinet can be prevented.

Further, with the mobile phone 1 which adopts the liquid crystal display device protection structure as stated above, the reinforcing frame 100 is adapted to provide a box-like shape with the front plate 101 and with the side plates 102 on all the sides. Specifically, the reinforcing frame has a box-like shape with four corners, each of which is formed by the front plate 101 and the adjacent side plates 102, 102. With this structure, the rigidity of the reinforcing frame 100 itself is greatly increased, which results in the rigidity of the upper inner casing 3I where the reinforcing frame 100 is fixed being substantially improved. Therefore, damage to the liquid crystal display device 7 when the display screen protection cover 9 is pressed from the outside being extremely effectively prevented.

Referring to FIG. 6, to assemble the mobile phone 1 having a configuration as stated above, the display screen protection cover 9 is mounted to the upper inner casing 3I where the reinforcing frame 100 is fixed. Thus, the upper inner casing 3I, the reinforcing frame 100, and the display screen protection cover 9 are handled as a single component, i.e., a casing assembly. The circuit board 5 loaded with the liquid crystal display device 7 is mounted to the casing assembly, specifically, the upper inner casing 3I by using screws S, and then the upper outer casing 3O is assembled to the upper inner casing 3I.

With the mobile phone 1 which adopts the liquid crystal display device protection structure as stated above, the assembling operation can be performed extremely simply by handling the upper inner casing 3I, the reinforcing frame 100, and the display screen protection cover 9 as a casing assembly or a single component, which allows substantial increase in the production efficiency to be achieved.

FIG. 7 to FIG. 12 show a second embodiment where a liquid crystal display device protection structure relating to the present invention is applied to a mobile phone, which is a type of electronic equipment. An upper cabinet (equipment cabinet) 13 in the foldable mobile phone 10 comprises an upper inner casing 13I and an upper outer casing 13O which are assembled to each other, and the upper inner casing 13I and the upper outer casing 13O are both manufactured in a desired shape by injection molding of plastic material.

Figure 7:
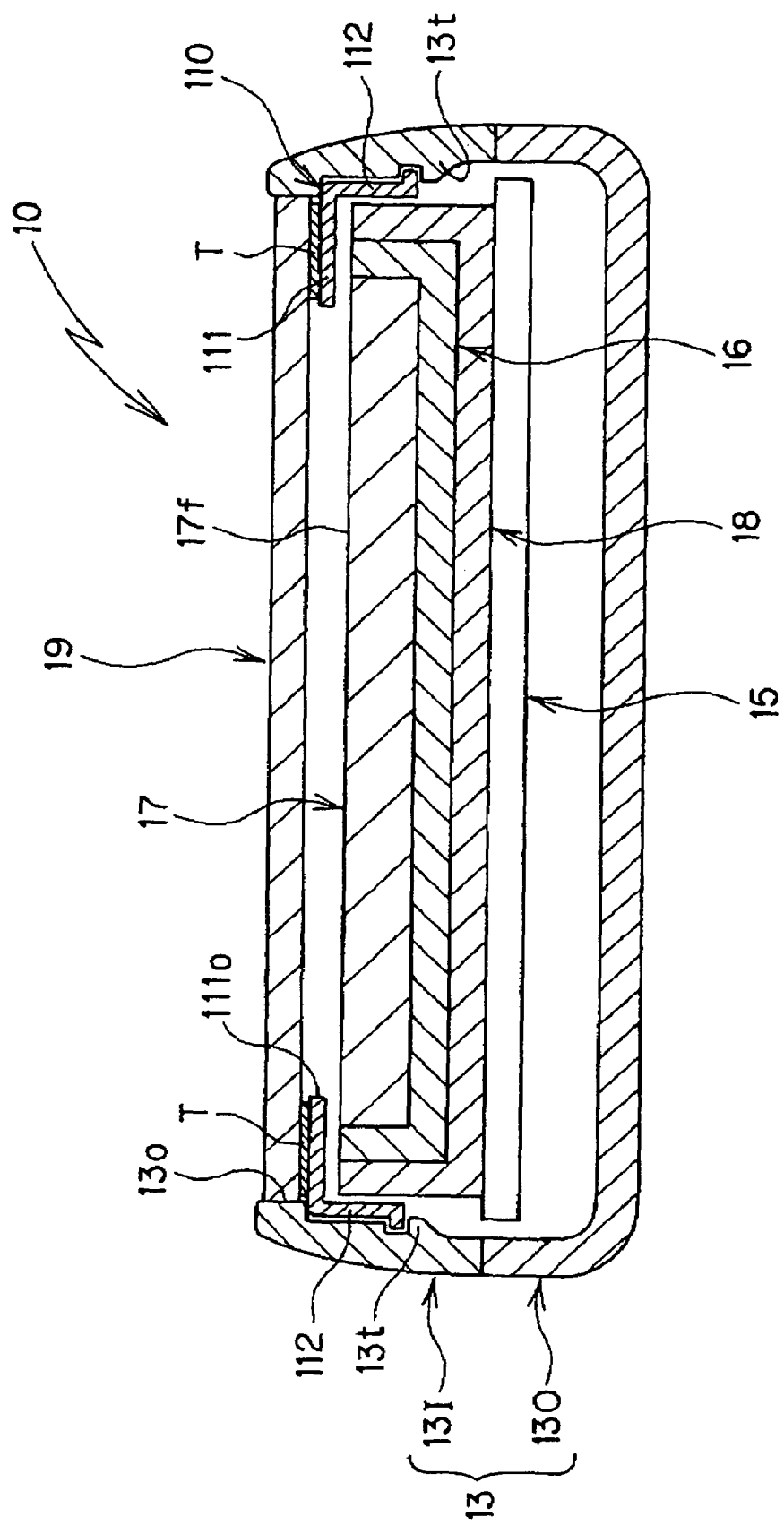
FIG. 7 is a transverse cross section showing a second embodiment of electronic equipment which adopts a liquid crystal display device protection structure relating to the present invention.
Figure 8:
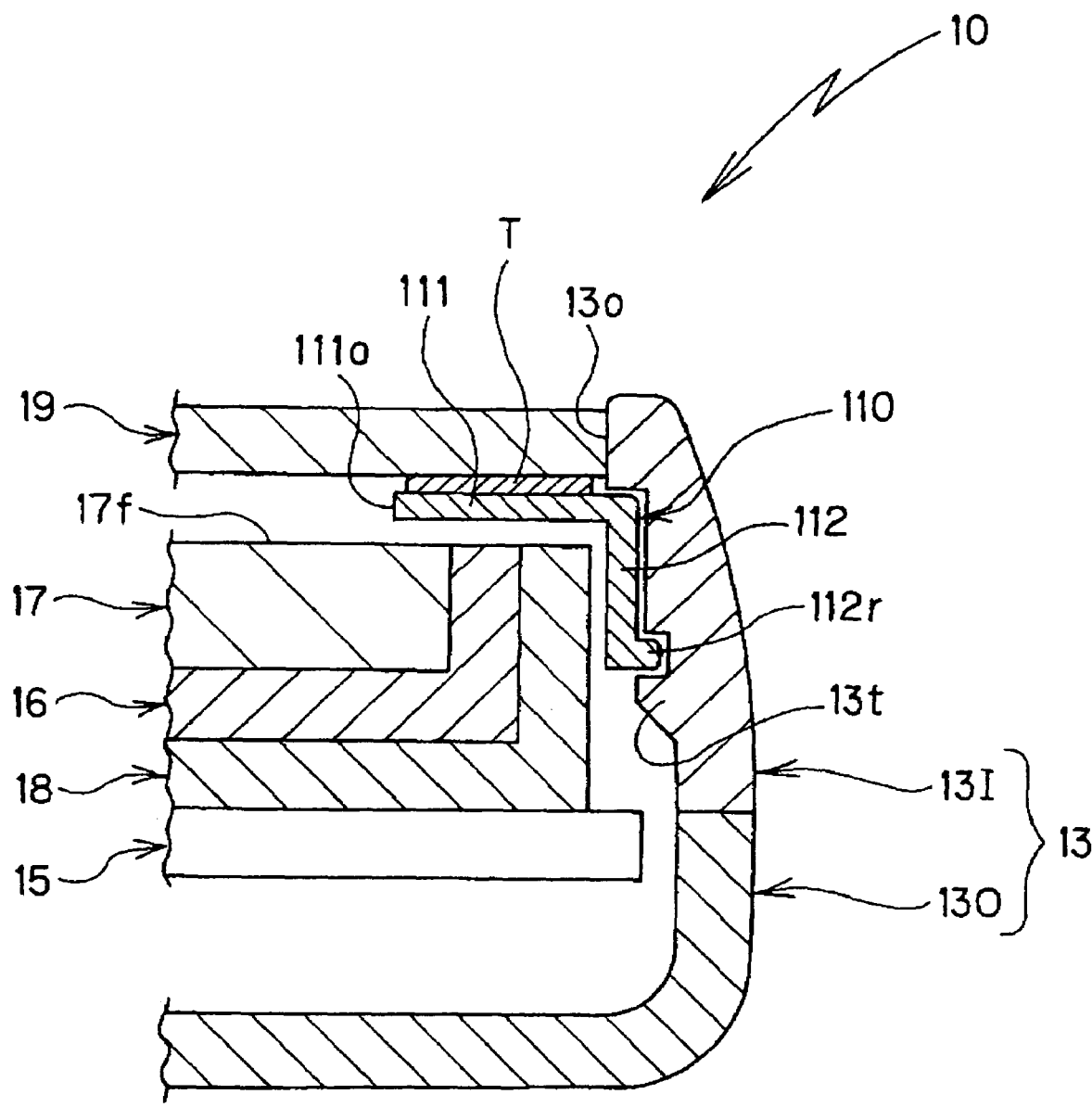
FIG. 8 is a main portion enlarged sectional view showing electronic equipment of the second embodiment.
Figure 9:
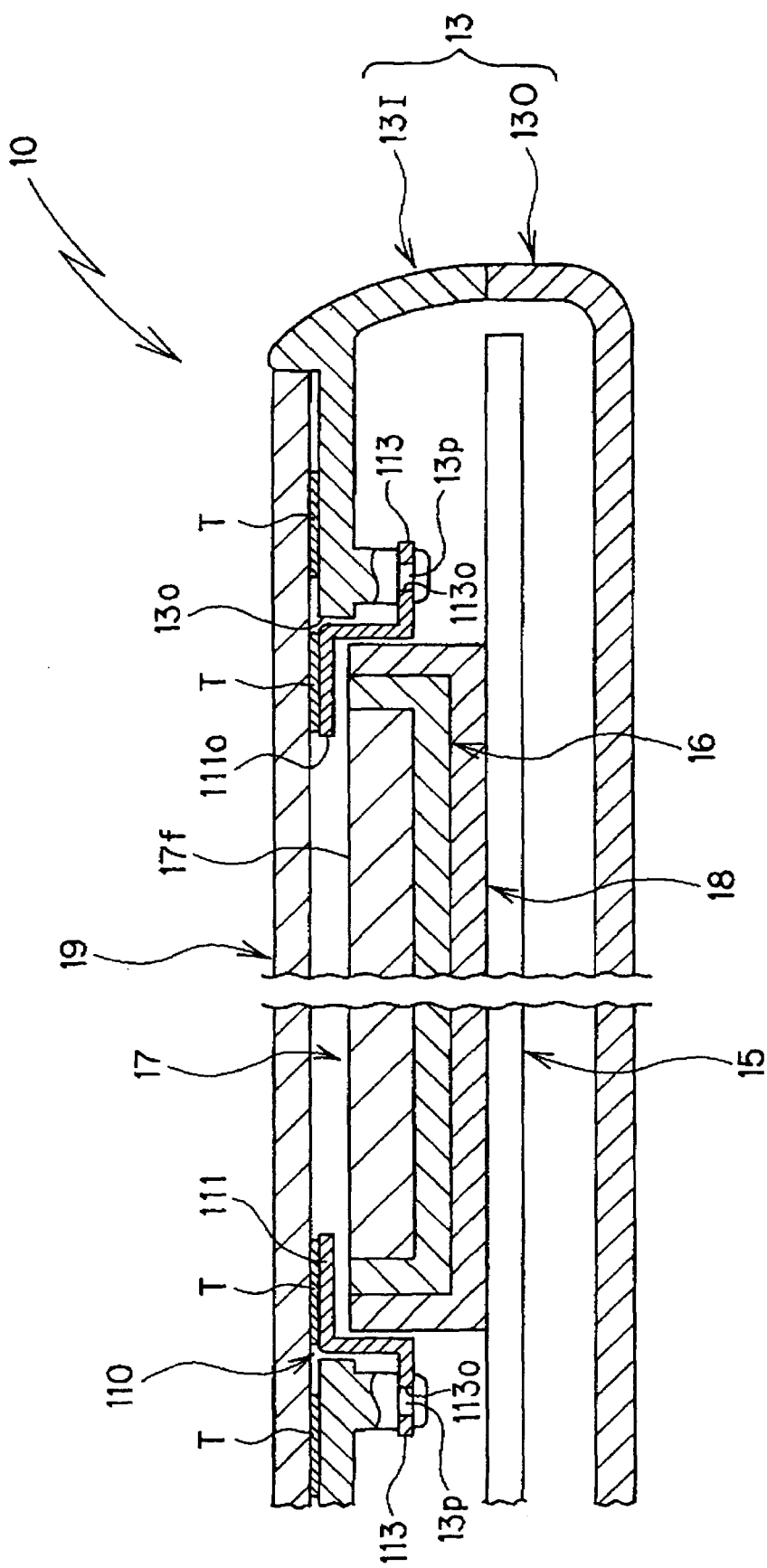
FIG. 9 is a longitudinal section showing electronic equipment of the second embodiment.

As shown in FIG. 7 to FIG. 9, a circuit board 15 is accommodated in the inside of the upper cabinet 13, and on the component mounting surface of the circuit board 15, a backlight device 16 and a liquid crystal display device 17 constituting a liquid crystal display unit are mounted in a prescribed location through a holder 18.

In the upper inner casing 13I of the upper cabinet 13 is formed a viewing window 13o which is faced with the display screen 17f of the liquid crystal display device 17. To the front of the inner casing 13I is mounted a display screen protection cover 19 made of a light transmitting material, such as a clear acrylic plastic material, with the use of a double-sided adhesive tape T (see FIG. 9). The viewing window 13o in the upper inner casing 13I is covered with the display screen protection cover 19.

Further, in the upper inner casing 13I of the upper cabinet 13, a reinforcing frame 110 having a frame shape which is matched to the periphery of the viewing window 13o is integrally fixed to the upper inner casing 13I, the reinforcing frame 110 being formed by press working (drawing forming) of a material with a mechanical strength higher than that of the plastic material used for the upper inner casing 13I and the like, specifically, of a stainless steel sheet.

Figure 10:
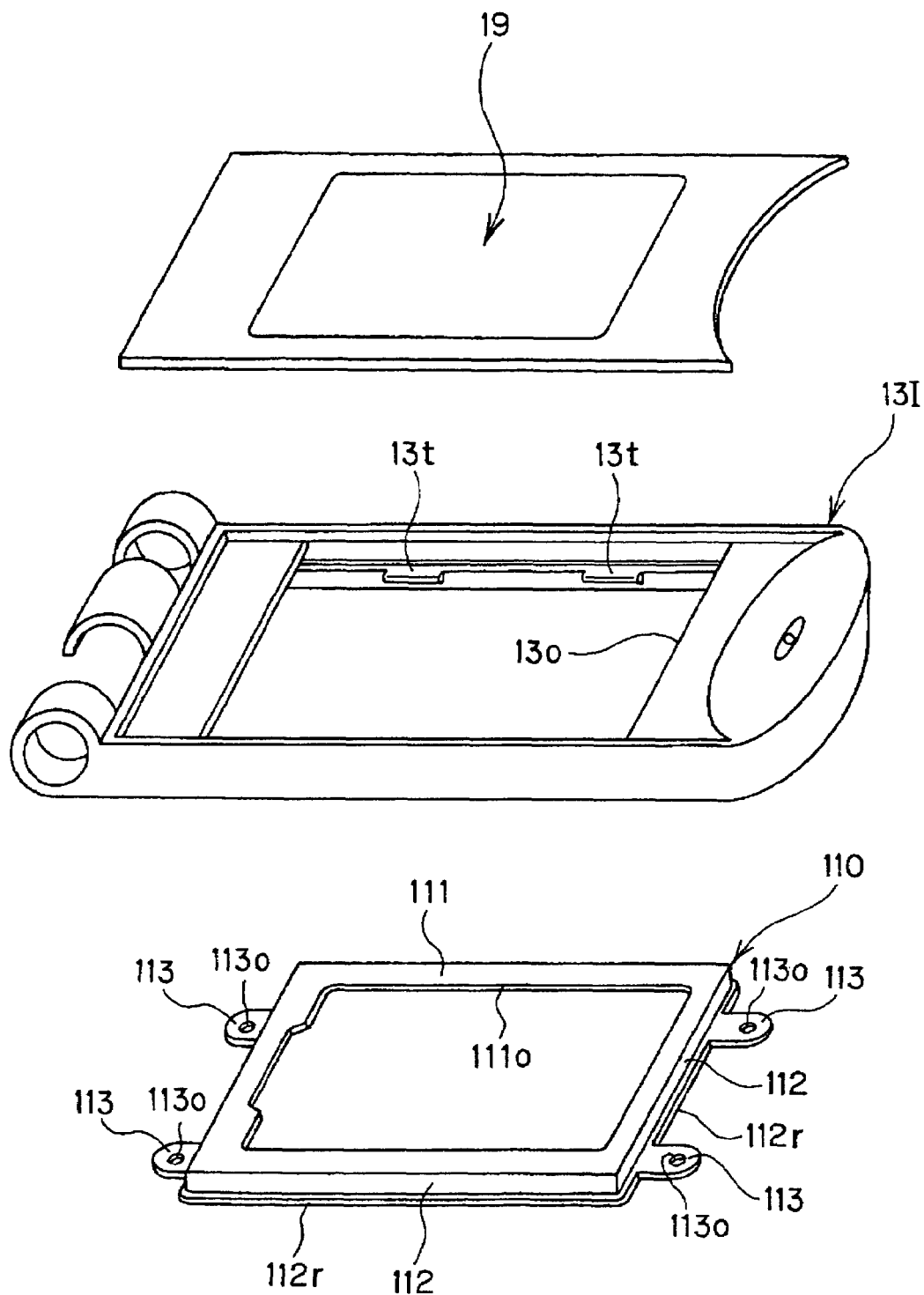
FIG. 10 is an exploded perspective view showing an upper inner casing assembly in electronic equipment of the second embodiment.
Figure 11:
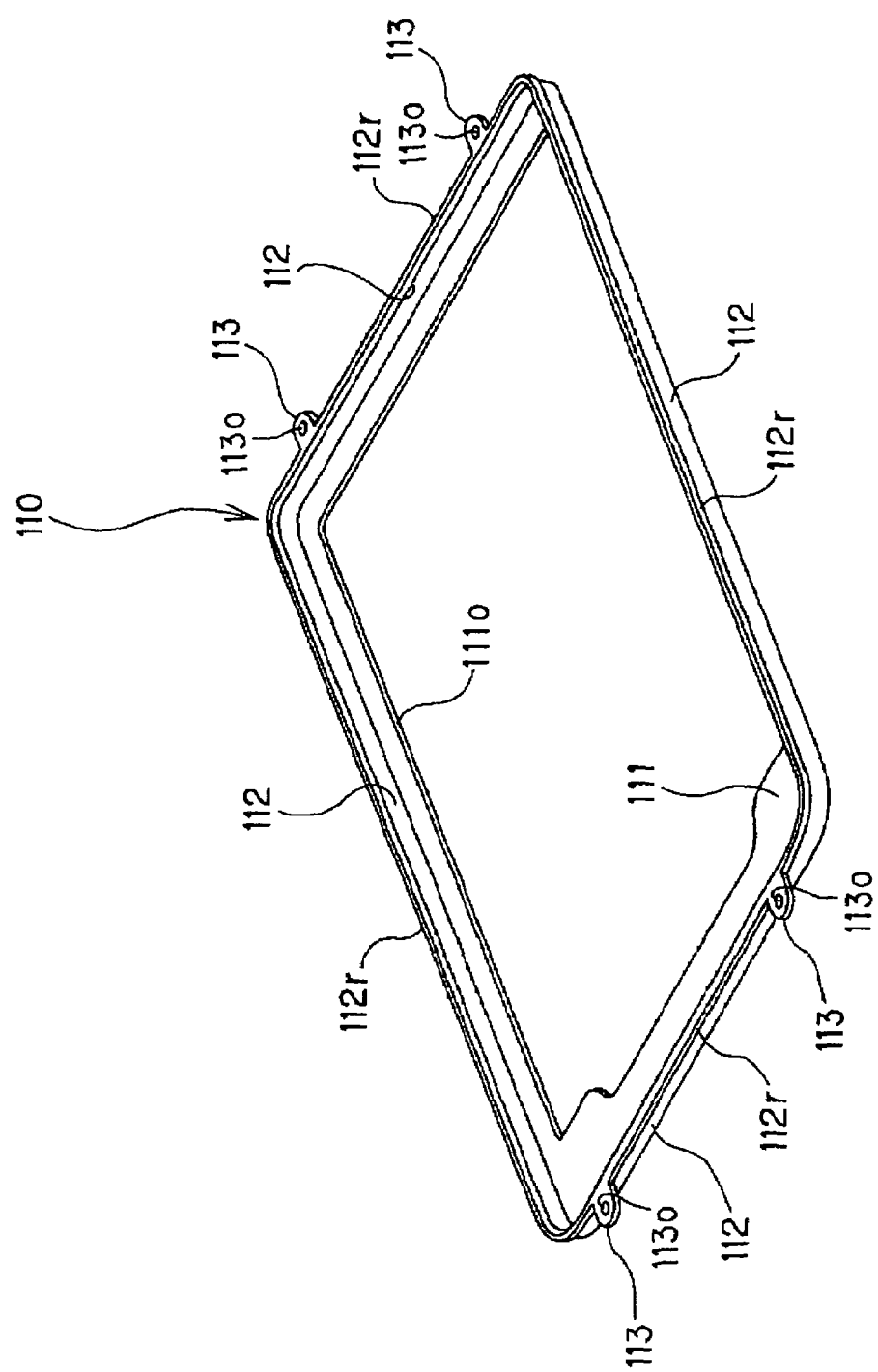
FIG. 11 is an appearance perspective view showing a reinforcing frame in electronic equipment of the second embodiment.
Figure 12:
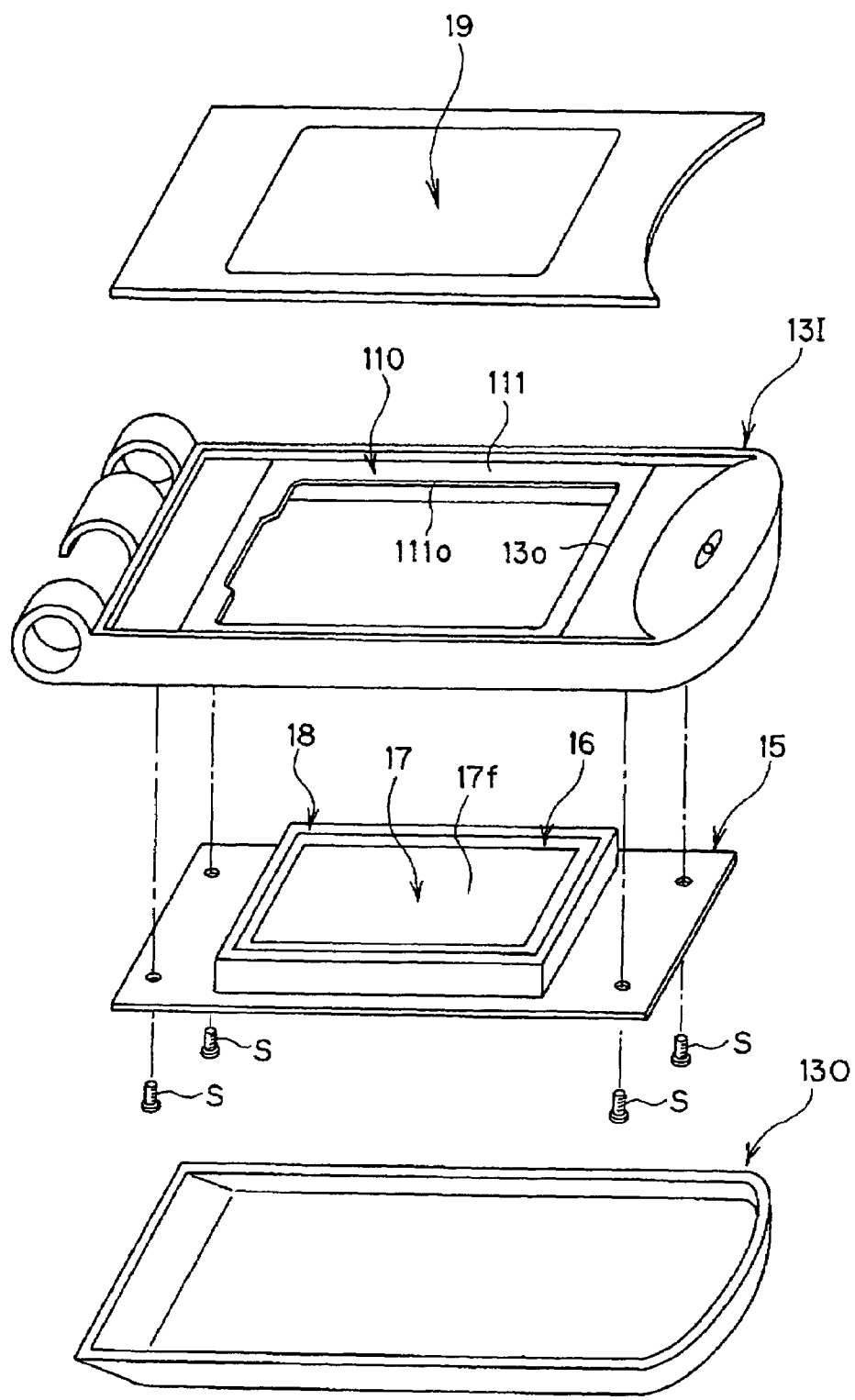
FIG. 12 is an exploded perspective view showing electronic equipment of the second embodiment.

As shown in FIG. 10 and FIG. 11, the reinforcing frame 110 has a front plate 111 which is developed so as to be matched to the display screen 17f of the liquid crystal display device 17, and also has side plates 112 on all the sides that surround the liquid crystal display device 17, being developed from the outer edge of the front plate 111 in the direction along the plate thickness, specifically, towards the inside of the upper inner casing 13I, and being formed over the entire periphery of the front plate 111.

In the front plate 111 of the reinforcing frame 110, an opening 111o for exposing the display screen 17f of the liquid crystal display device 17 is formed. At the edges of the side plates 112 on all the sides, a rib 112r is formed over the entire periphery. On each of a pair of side plates 112, 112, which are opposed in the longitudinal direction, two tabs 113 each having a mounting hole 113o are formed as being protruded (thus four tabs are formed in total).

As stated above, the reinforcing frame 110 comprising the front plate 111 having the opening 111o and the side plates 112 on all the sides provides a frame shape which is matched to the periphery of the viewing window 13o, and also provides a box-like shape having four corners each of which is formed by the front plate 111 and the adjacent side plates 112, 112.

As shown in FIG. 7, FIG. 9, and FIG. 10, in the inside of the upper inner casing 13I, four hooking claws 13t are formed inside the side walls which are opposed to each other, and four mounting pins 13p are formed to be protruded inside the front wall, sandwiching the viewing window 13o. By hooking the ribs 112r of the reinforcing frame 110 to the respective hooking claws 13t, and heating and pressing the head of the mounting pin 13p that is inserted into the mounting hole 113o in the respective tabs 113 for upsetting and welding it, the reinforcing frame 110 is integrally fixed in the prescribed location in the upper inner casing 13I.

As shown in FIG. 7 to FIG. 9, and FIG. 12, the front plate 111 of the reinforcing frame 110 which is fixed to the upper inner casing 13I is exposed in the viewing window 13o in the upper inner casing 13I, and to the front plate 111 (the reinforcing frame 110), the display screen protection cover 19 is mounted by using the double-sided adhesive tape T.

Also with the mobile phone 10 which adopts the liquid crystal display device protection structure as stated above, the outline size can be minimized while damage to the liquid crystal display device 17 can be prevented, in completely the same manner as with the mobile phone 1 in the first embodiment described above in detail, even when the display screen protection cover 19 is pressed from the outside, or when the upper cabinet 13 is dropped, for example, and subjected to a great impact force.

When the mobile phone 10 having a configuration as stated above is assembled, the display screen protection cover 19 is mounted to the upper inner casing 13I where the reinforcing frame 110 is fixed as shown in FIG. 10. The upper inner casing 13I, the reinforcing frame 110, and the display screen protection cover 19 are handled as a single component, i.e., a casing assembly. The circuit board 15 loaded with the liquid crystal display device 17 is mounted to the casing assembly, specifically, the upper inner casing 13I by using screws S. Then the upper outer casing 13O is assembled to the upper inner casing 13I. Therefore, the assembling operation can be performed extremely simply, and a substantial increase in the production efficiency can be achieved.

FIG. 13 to FIG. 18 show a third embodiment where a liquid crystal display device protection structure relating to the present invention is applied to a mobile phone, which is a type of electronic equipment. An upper cabinet (equipment cabinet) 23 in this foldable mobile phone 20 comprises an upper inner casing 23I and an upper outer casing 23O which are assembled to each other. The upper inner casing 23I and the upper outer casing 23O are both manufactured in a desired shape by injection molding of plastic material.

Figure 13:
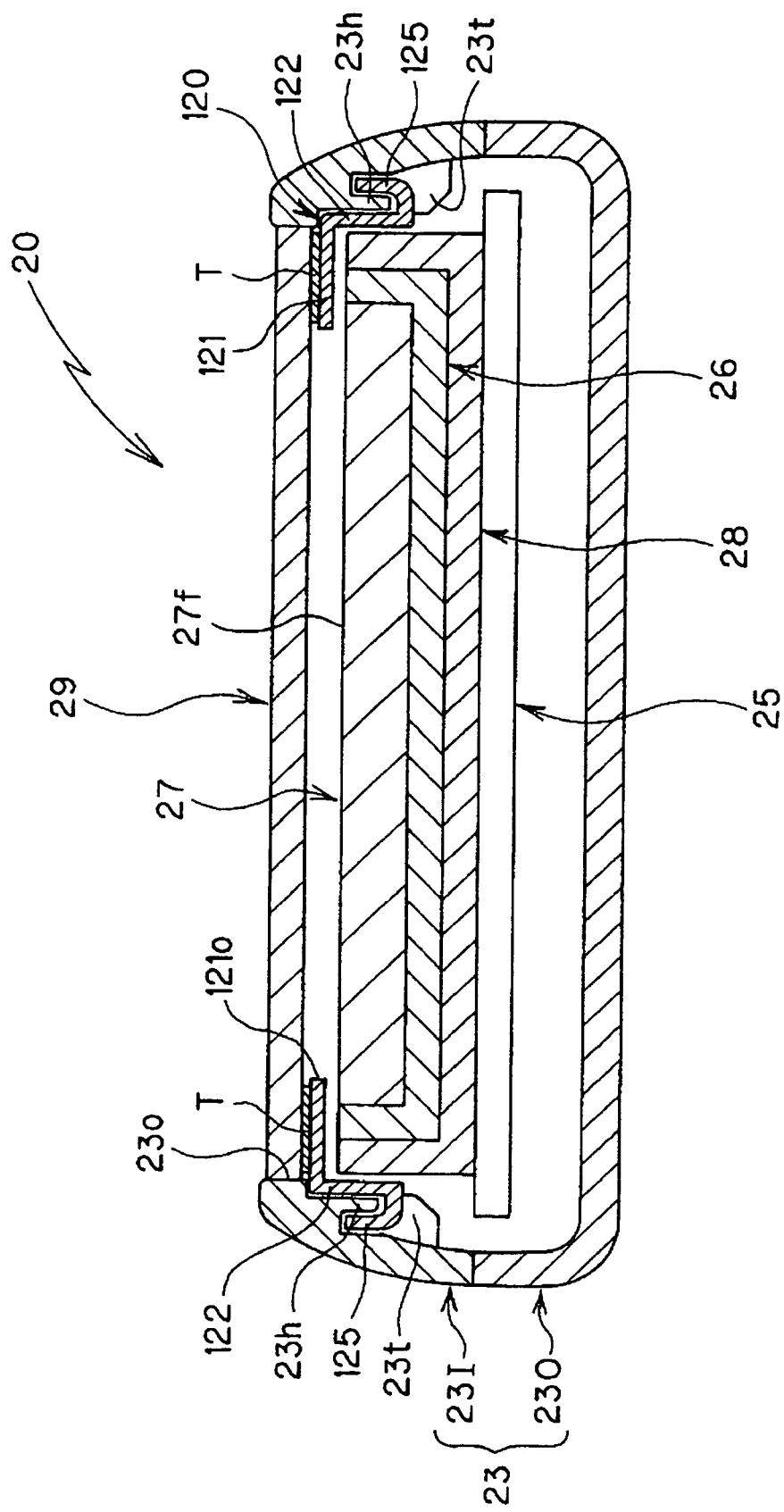
FIG. 13 is a transverse cross section showing a third embodiment of electronic equipment which adopts a liquid crystal display device protection structure relating to the present invention.
Figure 14A:
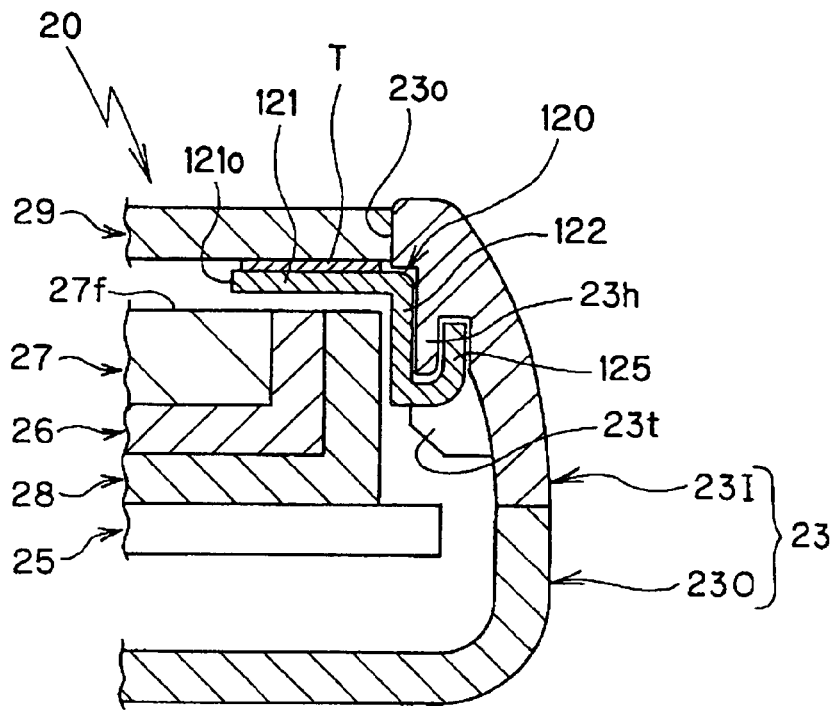
FIG. 14A and FIG. 14B are main portion enlarged sectional views showing electronic equipment of the third embodiment.
Figure 14B:
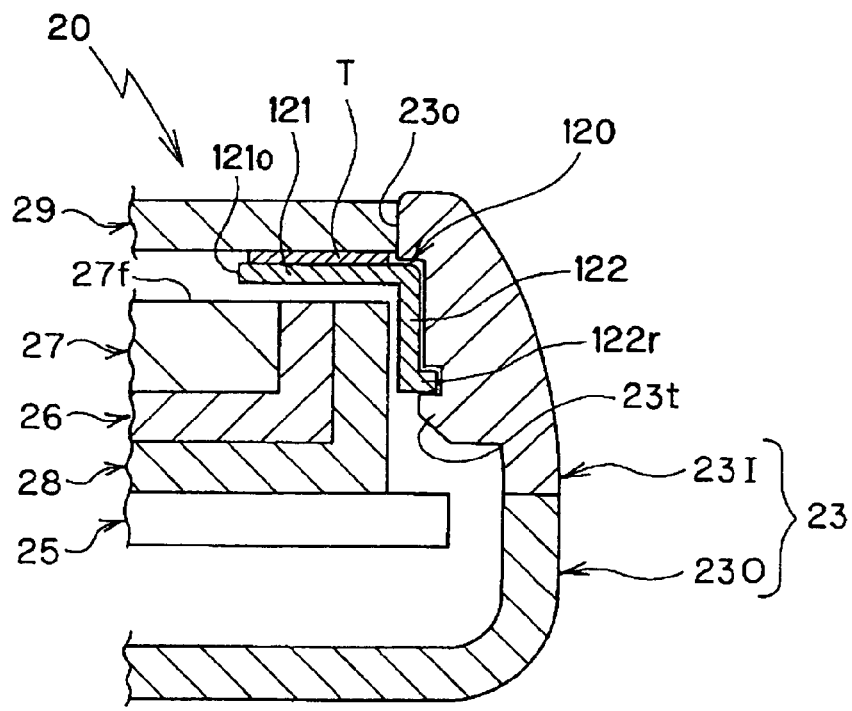
Figure 15:
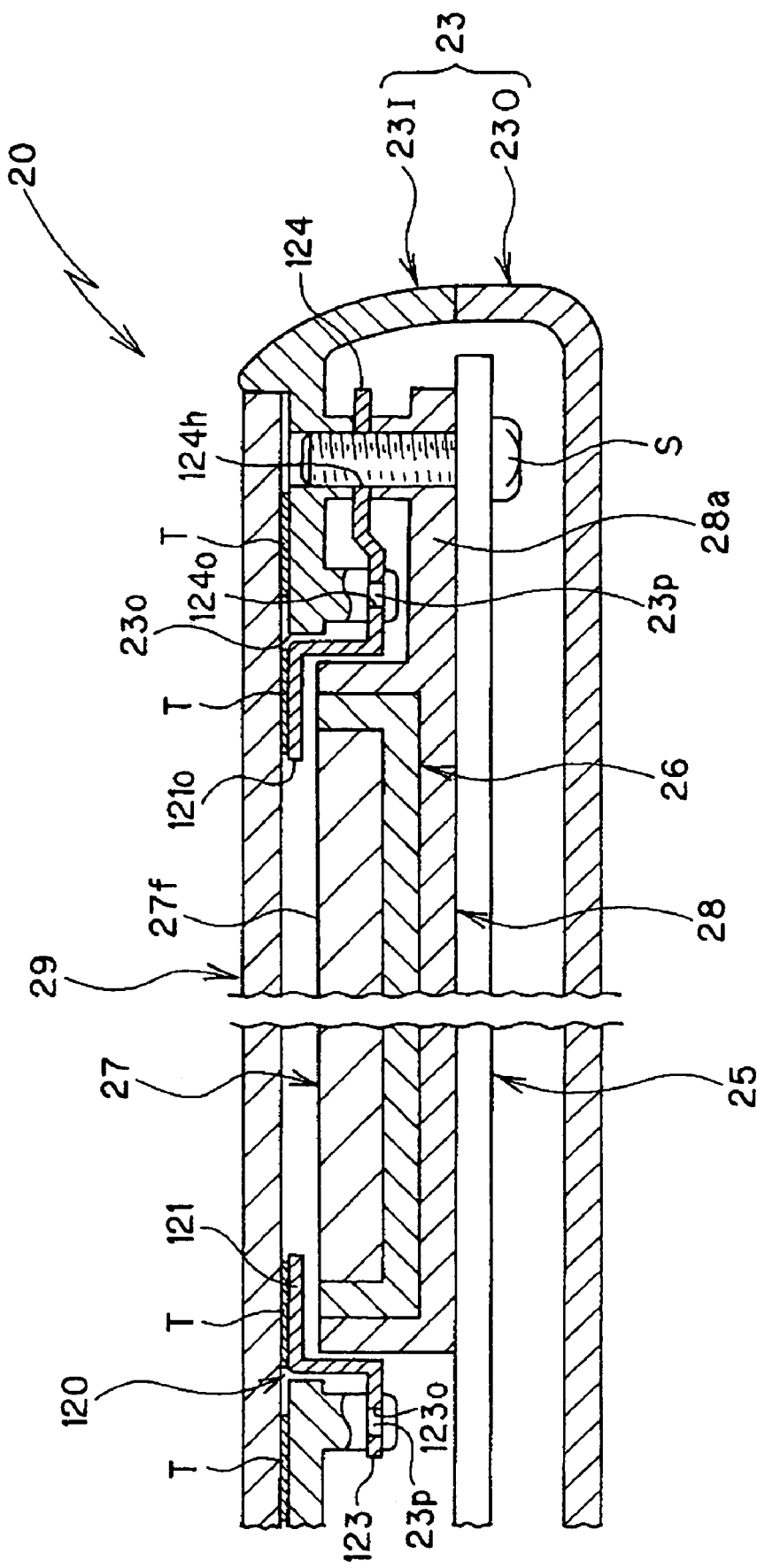
FIG. 15 is a longitudinal section showing electronic equipment of the third embodiment.

As shown in FIG. 13 to FIG. 15, a circuit board 25 is accommodated in the inside of the upper cabinet 23. On the component mounting surface of the circuit board 25, a backlight device 26 and a liquid crystal display device 27 constituting a liquid crystal display unit are mounted in a prescribed location through a holder 28.

In the upper inner casing 23I of the upper cabinet 23 is formed a viewing window 23o which is faced with the display screen 27f of the liquid crystal display device 27. To the front of the inner casing 23I is mounted a display screen protection cover 29 made of a light transmitting material, such as a clear acrylic plastic material, with the use of a double-sided adhesive tape T (see FIG. 15). The viewing window 23o in the upper inner casing 23I is covered with the display screen protection cover 29.

Further, in the upper inner casing 23I of the upper cabinet 23, a reinforcing frame 120 having a frame shape which is matched to the periphery of the viewing window 23o is integrally fixed to the upper inner casing 23I. The reinforcing frame 120 is formed by press working (drawing forming) of a material with a mechanical strength higher than that of the plastic material used for the upper inner casing 23I and the like, specifically, of a stainless steel sheet.

Figure 16:
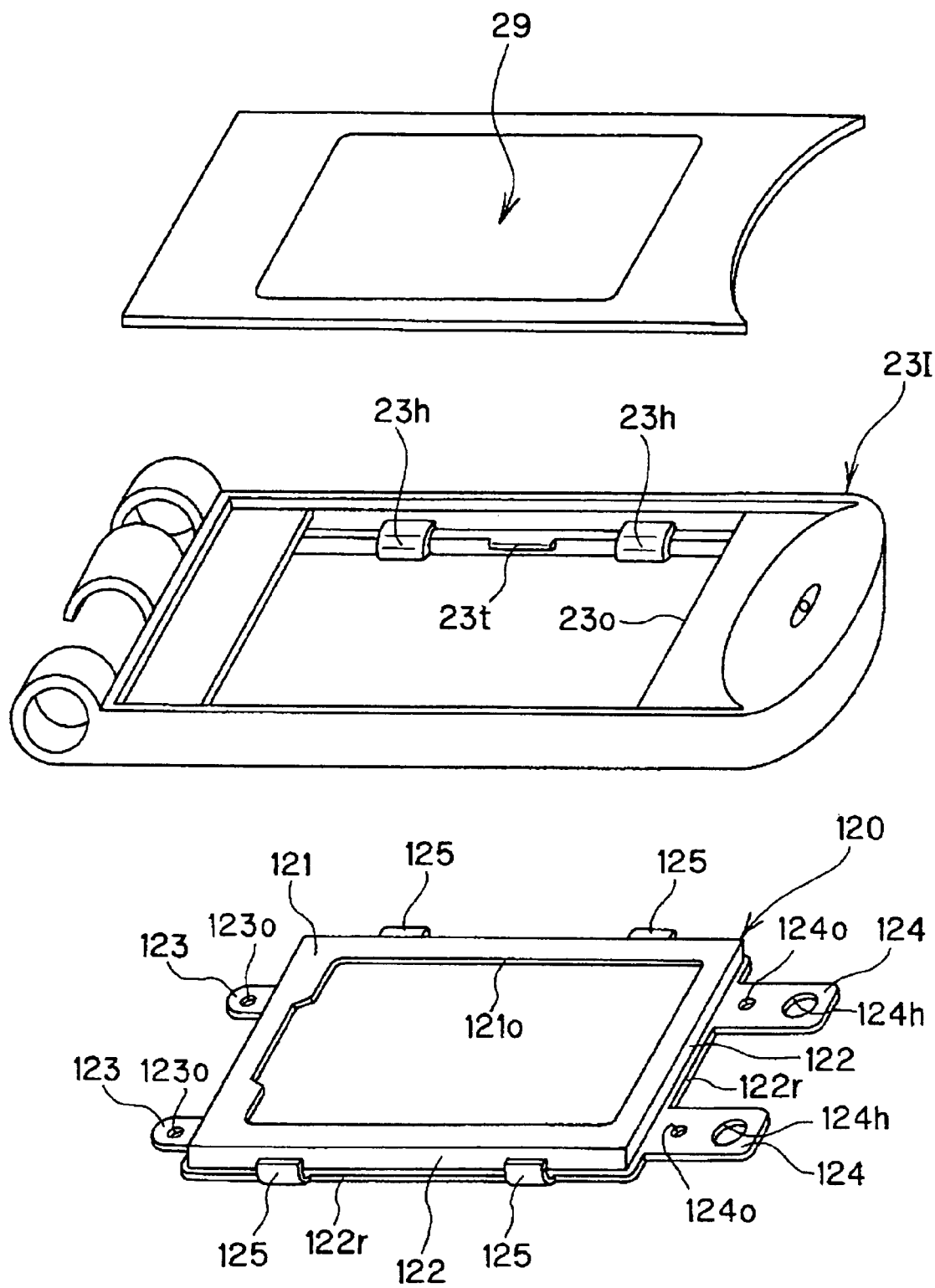
FIG. 16 is an exploded perspective view showing an upper inner casing assembly in electronic equipment of the third embodiment.
Figure 17:
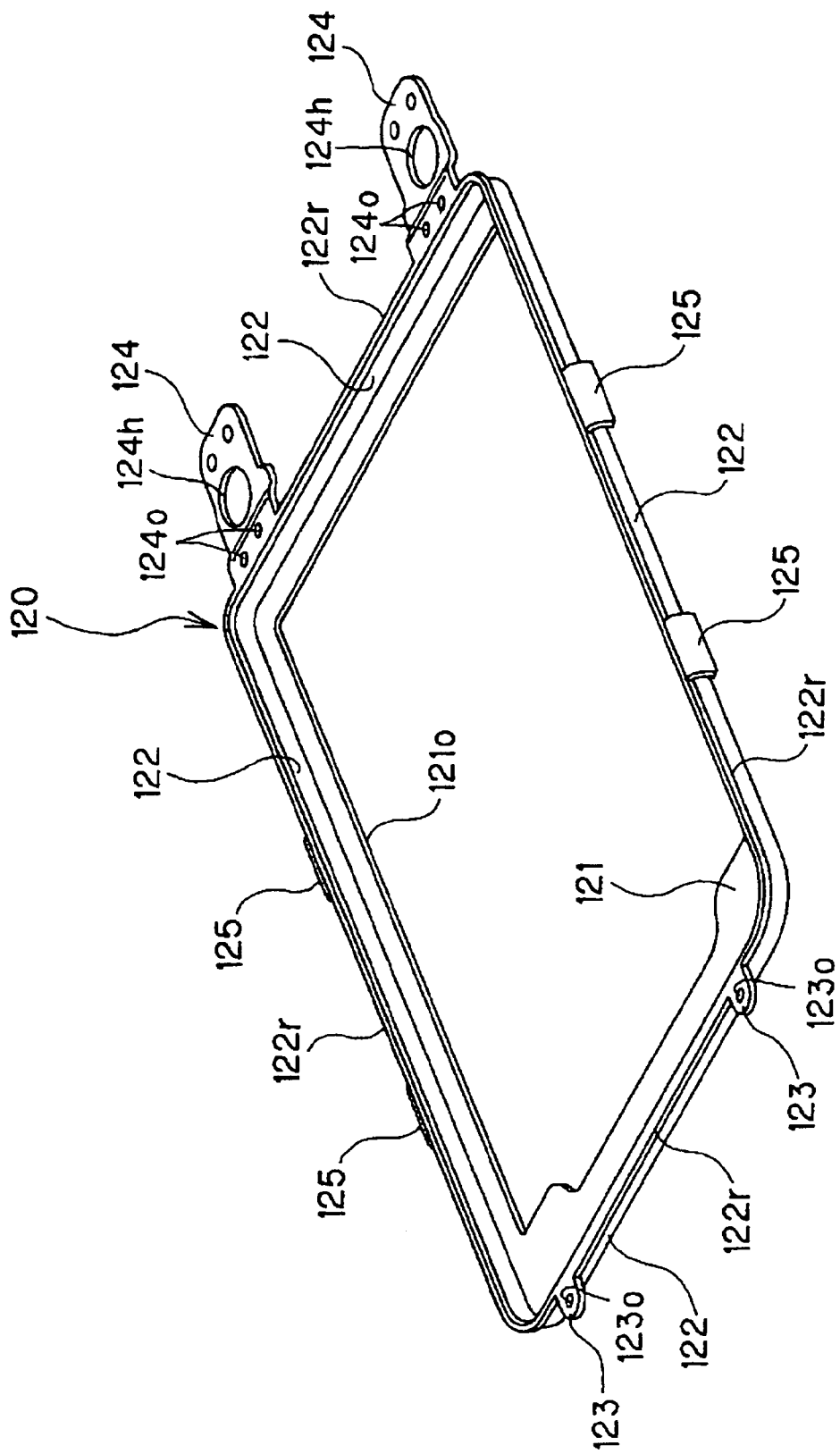
FIG. 17 is an appearance perspective view showing a reinforcing frame in electronic equipment of the third embodiment.

As shown in FIG. 16 and FIG. 17, the reinforcing frame 120 has a front plate 121 which is developed so as to be matched to the display screen 27f of the liquid crystal display device 27. The reinforcing frame 120 also has side plates 122 on all the sides that surround the liquid crystal display device 27. The side plates 122 are developed from the outer edge of the front plate 121 in the direction along the plate thickness, specifically, towards the inside of the upper inner casing 23I, and are formed over the entire periphery of the front plate 121.

In the front plate 121 of the reinforcing frame 120, an opening 121o for exposing the display screen 27f of the liquid crystal display device 27 is formed. At the edges of the side plates 122 on all the sides, a rib 122r is formed over the entire periphery.

The reinforcing frame 120 comprising the front plate 121 having the opening 121o and the side plates 122 arranged on all the sides thereof provides a frame shape which is matched to the periphery of the viewing window 23o. The front plate 121 also provides a box-like shape having four corners each of which is formed by the front plate 121 and the adjacent side plates 122, 122.

On one side plate 122 in the longitudinal direction of the reinforcing frame 120, two tabs 123 each having a mounting hole 123o are formed to be protruded. On the other side plate 122 in the longitudinal direction of the reinforcing frame 120, two tabs 124 each having a mounting hole 124o and a screw hole 124h are formed as being protruded. Further, on each of a pair of side plates 122, 122 which are opposed in the crosswise direction of the reinforcing frame 120, two hooks 125 are formed to be protruded toward the outside (thus four hooks are formed in total).

As shown in FIG. 13, FIG. 15, and FIG. 16, in the inside of each of the side walls of the upper inner casing 23I that are opposed to each other, one hooking claw and two hooks are formed (thus two hooking claws and four hooks are formed in total). Further, in the inside of the front walls in the upper inner casing 23I, four mounting pins 23*p* are formed to be protruded, sandwiching the viewing window 23*o*.

By hooking the ribs 122*r* to the respective hooking claws 23*t* in the upper inner casing 23I, engaging the hooks 125 with the hooks 23*h* in the upper inner casing 23I, and heating and pressing the heads of the mounting pins 23*p* that are inserted into the mounting holes 123*o* in the tabs 123 and the mounting holes 124*o* in the tabs 124 for upsetting and welding them, the reinforcing frame 120 is integrally fixed in the prescribed location in the upper inner casing 23I.

By engaging the hooks 125 in the reinforcing frame 120 with the hooks 23*h* in the upper inner casing 23I, the side walls of the upper inner casing 23I are connected to the reinforcing frame 120. Thus, an undesired deformation of the side walls of the upper inner casing 23I being prevented when an external force is applied.

As shown in FIG. 15, the tabs 124 of the reinforcing frame 120 are tightened to both the extension 28*a* (see FIG. 15 and FIG. 18) of the holder 28 and the upper inner casing 23I by means of the screws S which are penetrated through the screw holes 124*h*, thereby the portions of the upper inner casing 23I and the circuit board 25 that are poor in strength are connected to the reinforcing frame 120 to be effectively reinforced.

Figure 18:
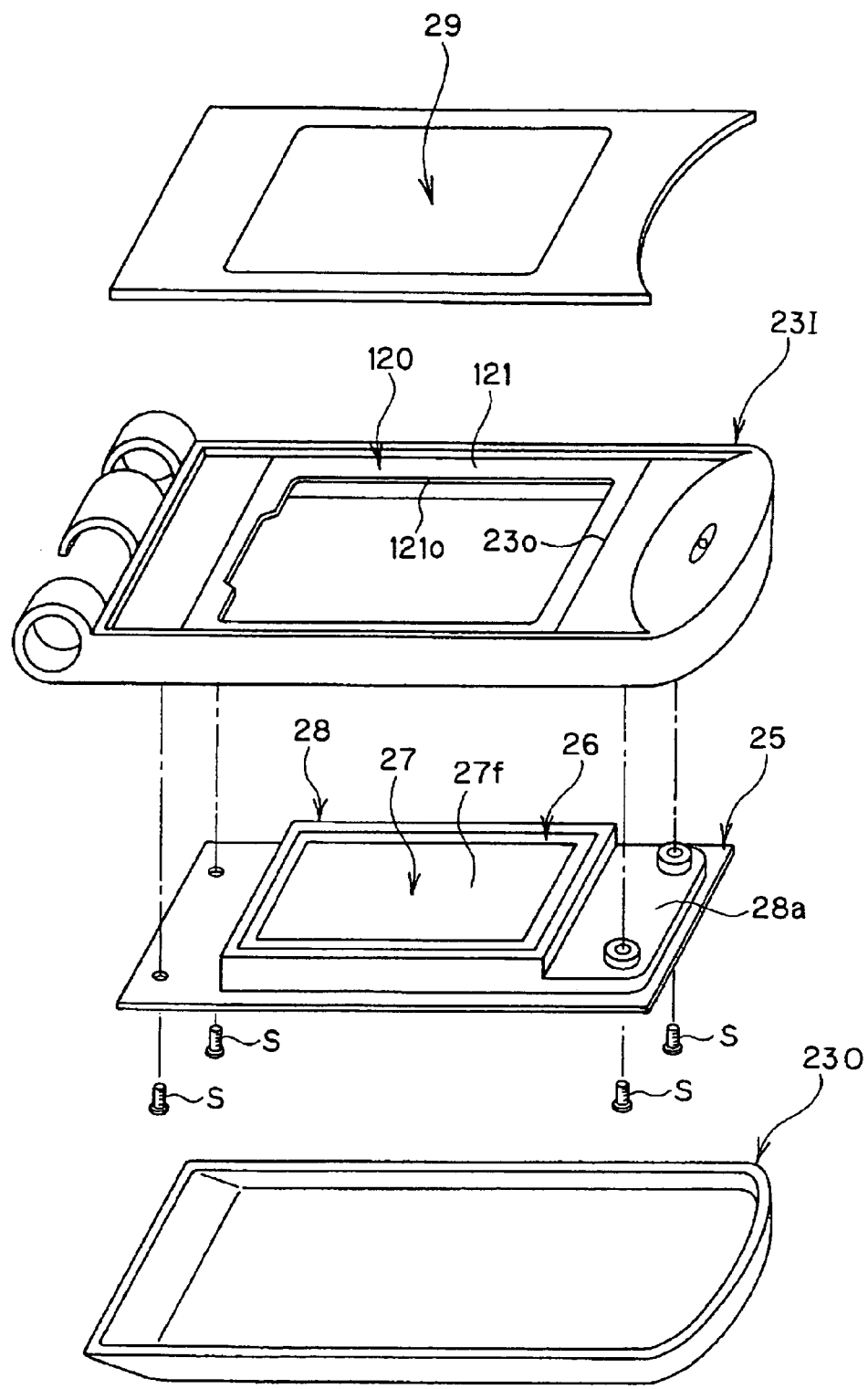
FIG. 18 is an exploded perspective view showing electronic equipment of the third embodiment.
Figure 19:
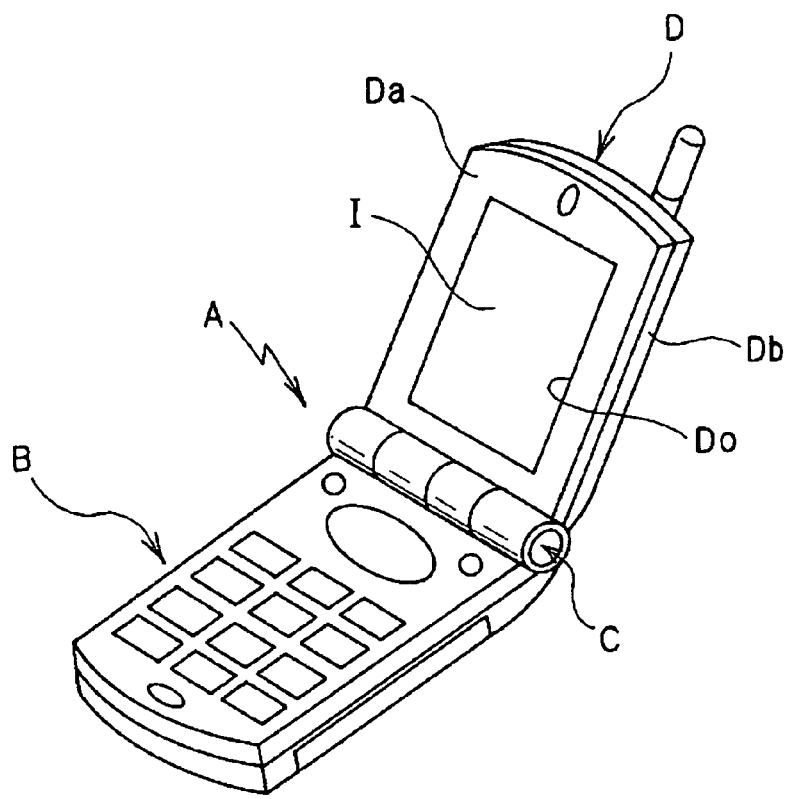
FIG. 19 is an appearance perspective view showing an example of conventional electronic equipment.
Figure 20:
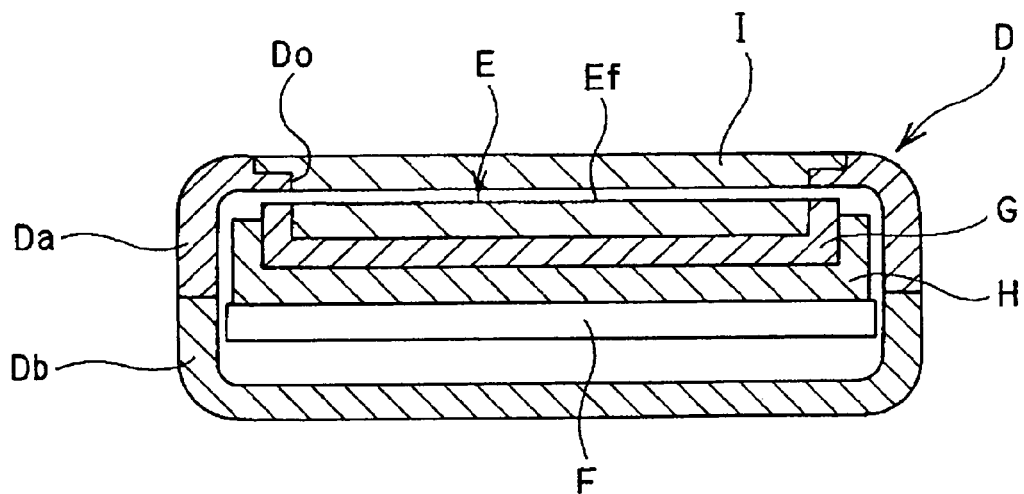
FIG. 20 is a schematic transverse cross section showing the conventional electronic equipment as shown in FIG. 19.
Figure 21:
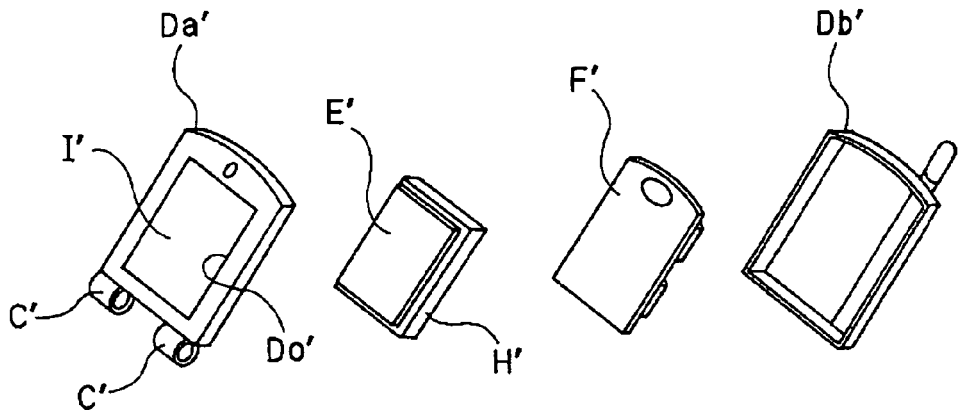
FIG. 21 is an exploded perspective view showing another conventional electronic equipment.
Figure 22:
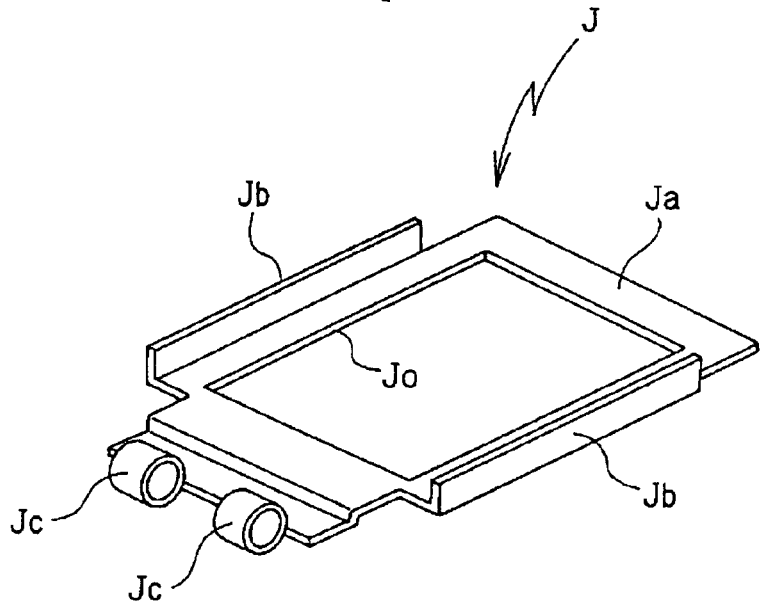
FIG. 22 is an appearance perspective view showing a reinforcing member in the conventional electronic equipment as shown in FIG. 21.
Figure 23:
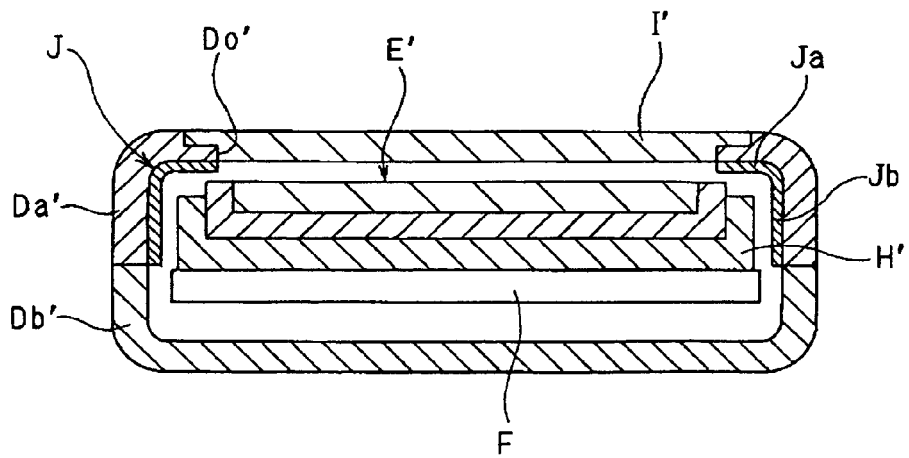
FIG. 23 is a schematic transverse cross section showing the conventional electronic equipment as shown in FIG. 21.

As shown in FIG. 13, FIG. 15, and FIG. 18, the front plate 121 of the reinforcing frame 120 which is fixed to the upper inner casing 23I is exposed in the viewing window 23*o* in the upper inner casing 23I. To the front plate 121 (the reinforcing frame 120), the display screen protection cover 29 is mounted by using the double-sided adhesive tape T.

Also with the mobile phone 20 which adopts the liquid crystal display device protection structure as stated above, the outline size can be minimized while damage to the liquid crystal display device 27 can be prevented in completely the same manner as in the first embodiment and the second embodiment described above, when a great impact force is applied such as when the display screen protection cover 29 is pressed from the outside, or when the upper cabinet 23 is dropped.

When the mobile phone 20 having a configuration as stated above is assembled, the display screen protection cover 29 is mounted to the upper inner casing 23I where the reinforcing frame 120 is fixed as shown in FIG. 18. The upper inner casing 23I, the reinforcing frame 120, and the display screen protection cover 29 are handled as a single component, i.e., a casing assembly. The circuit board 25 loaded with the liquid crystal display device 27 is mounted to the casing assembly, specifically, the upper inner casing 23I by using screws S, and then the upper outer casing 23O is assembled to the upper inner casing 23I. Therefore, the assembling operation can be performed extremely simply, and a substantial increase in the production efficiency can be achieved.

In each of the embodiments described above, the reinforcing frame is formed by drawing forming a stainless steel sheet. Alternatively, appropriate metallic materials other than stainless steel may be used for formation of the reinforcing frame, if it has a mechanical strength higher than that of the plastic material used for the upper inner casing and the like. Also, appropriate methods of forming other than drawing may be used for formation of the reinforcing frame.

However, although an appropriate material other than metallic materials may be used for formation of the reinforcing frame if it has a mechanical strength higher than that of the plastic material, using the metallic materials is, of course, the most advantageous from the viewpoint of workability and cost.

Further, by grounding the reinforcing frame made of a metallic material, and configured such that it surrounds the liquid crystal display device, the liquid crystal display device can be prevented from being broken down due to the static electricity applied from the outside. Further, such reinforcing frame may be used as an antenna.

In each of the embodiments described above, insert molding, welding, or using hooking claws and screws are mentioned as the configuration for integrally fixing the reinforcing frame to the upper inner casing. However, the reinforcing frame can, of course, be fixed to the upper inner casing by using a double-sided adhesive tape, an adhesive, or any other appropriate means which are not mentioned in the embodiments.

Also as means for mounting the display screen protection cover to the reinforcing frame and the upper inner casing, an adhesive, screws, or any appropriate means other than the double-sided tape that is mentioned in the embodiments, may be adopted.

Further, in the embodiments described above, the present invention is applied to a mobile phone, which is a type of electronic equipment. However, the present invention can also be applied, as an extremely effective liquid crystal display protection structure, to communication equipment such as a portable telephone and a PHS (personal handyphone system), portable information terminals such as an electronic dictionary and a PDA (personal data assistance), and other various types of electronic equipment having a liquid crystal display device.

What is claimed is:

1. A liquid crystal display device protection structure for electronic equipment having an equipment cabinet made of a plastic material in which a liquid crystal display device is accommodated, the equipment cabinet formed with a viewing window for facing a display screen of the liquid crystal display device, comprising:

a reinforcing frame made of a material having a mechanical strength greater than that of the plastic material used for the equipment cabinet, and having a frame shape which matches a periphery of the viewing window, the reinforcing frame being integrally fixed to the equipment cabinet to match the periphery of the viewing window; and a display screen protection cover mounted to the reinforcing frame and covering the viewing window;

wherein the equipment cabinet includes a mounting pin and the reinforcing frame includes a mounting hole, and wherein the reinforcing frame is integrally fixed to the equipment cabinet by heating and pressing a head of the mounting pin into the mounting hole.

2. The liquid crystal display device protection structure for electronic equipment of claim 1, wherein the mounting pin includes a protruding portion that is inserted into the mounting hole, and wherein the reinforcing frame is integrally fixed to the equipment cabinet by heating and pressing the protruding portion inserted into the mounting hole.

* * * * *